United States Patent
Takiguchi

(10) Patent No.: US 7,119,818 B2
(45) Date of Patent: Oct. 10, 2006

(54) IMAGE MANAGEMENT APPARATUS AND METHOD, RECORDING MEDIUM CAPABLE OF BEING READ BY A COMPUTER, AND COMPUTER PROGRAM

(75) Inventor: Hideo Takiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 635 days.

(21) Appl. No.: 10/241,577

(22) Filed: Sep. 12, 2002

(65) Prior Publication Data

US 2003/0058276 A1    Mar. 27, 2003

(30) Foreign Application Priority Data

Sep. 27, 2001  (JP)  ............................. 2001/297200

(51) Int. Cl.
  *G06F 17/00*  (2006.01)
  *H04N 5/225*  (2006.01)
(52) U.S. Cl. .................. 345/764; 715/730; 715/732; 715/763; 348/207.1; 348/207.11; 348/207.2
(58) Field of Classification Search ............... 715/781, 715/700, 761–765, 809, 716, 730–732; 348/207.11, 348/333.05, 207.1, 207.2
See application file for complete search history.

(56) References Cited

U.S. PATENT DOCUMENTS

| | | | | |
|---|---|---|---|---|
| 5,680,558 A | | 10/1997 | Hatanaka et al. ........... 395/334 |
| 5,819,261 A | | 10/1998 | Takahashi et al. ............. 707/3 |
| 5,874,999 A | * | 2/1999 | Suzuki et al. ............... 348/556 |
| 5,977,974 A | | 11/1999 | Hatori et al. ............... 345/349 |
| 6,018,744 A | | 1/2000 | Mamiya et al. ............. 707/104 |
| 6,237,010 B1 | * | 5/2001 | Hui et al. .................... 715/502 |
| 6,333,748 B1 | | 12/2001 | Takiguchi et al. .......... 345/589 |
| 6,373,507 B1 | * | 4/2002 | Camara et al. ............. 715/825 |
| 6,590,586 B1 | * | 7/2003 | Swenton-Wall et al. .... 715/730 |
| 6,623,119 B1 | * | 9/2003 | Lehmeier et al. ........... 351/239 |
| 6,628,899 B1 | * | 9/2003 | Kito ............................. 396/56 |
| 6,784,925 B1 | * | 8/2004 | Tomat et al. .......... 348/207.11 |
| 6,801,327 B1 | * | 10/2004 | Haneda et al. ............... 358/1.1 |
| 6,879,728 B1 | * | 4/2005 | Fisher et al. ................. 382/254 |
| 6,914,625 B1 | * | 7/2005 | Anderson et al. ........ 348/222.1 |
| 2001/0011992 A1 | * | 8/2001 | Juen et al. .................... 345/156 |
| 2001/0026371 A1 | * | 10/2001 | Nozaki ........................ 358/1.1 |
| 2001/0034772 A1 | * | 10/2001 | Fisher et al. ................. 709/217 |
| 2001/0048774 A1 | * | 12/2001 | Seki et al. ................... 382/305 |
| 2002/0001100 A1 | * | 1/2002 | Kawanabe ................. 358/1.15 |
| 2002/0018138 A1 | * | 2/2002 | Yoshiro ................. 348/333.05 |
| 2002/0047869 A1 | | 4/2002 | Takiguchi .................... 345/838 |
| 2002/0093678 A1 | * | 7/2002 | Skidgel et al. ............. 358/1.15 |
| 2004/0100486 A1 | * | 5/2004 | Flamini et al. ............. 345/723 |
| 2004/0201711 A1 | * | 10/2004 | Lopaz ................... 348/211.99 |

* cited by examiner

*Primary Examiner*—Tadesse Hailu
(74) *Attorney, Agent, or Firm*—Fitzpatrick, Cella, Harper & Scinto

(57) ABSTRACT

In order to simplify the user's operation when receiving images from an image input device, when reception of images stored in a digital camera have been selected by the user from a dialog displayed on a display, the user is directed to select the type of images to be received, by displaying a dialog for selecting the type of images. Furthermore, by displaying a dialog for directing the user to select how the received images are to be processed, the user is directed to select contents of subsequent processing.

34 Claims, 23 Drawing Sheets

ZoomBrowser EX AUTOMATIC EXECUTION

IMAGE RECEPTION HAS BEEN COMPLETED.
IS PROCESSING TO BE FURTHER PERFORMED?

- ⦿ DISPLAY SLIDE SHOW (D)
- ○ FORM ELECTRONIC MAIL (S)
- ○ PERFORM LAYOUT PRINTING (L)
- ○ UPLOAD IN ON-LINE PHOTO SERVICE (U)
- ○ PERFORM INDEX PRINTING (P)

[ OK (O) ]  [ CANCEL (C) ]  [ HELP (H) ]

FIG.16

[ Print Mark ] ~~~160a
..100Abcde ¥ IMG_0001.JPG ⎫
..101Abcde ¥ IMG_0123.JPG ⎬ 160a1
..101Abcde ¥ IMG_0124.JPG ⎭

[ Transfer Mark ] ~~~160b
..100Abcde ¥ IMG_0056.JPG ⎫ 160b1
..102Abcde ¥ IMG_0211.JPG ⎭

160

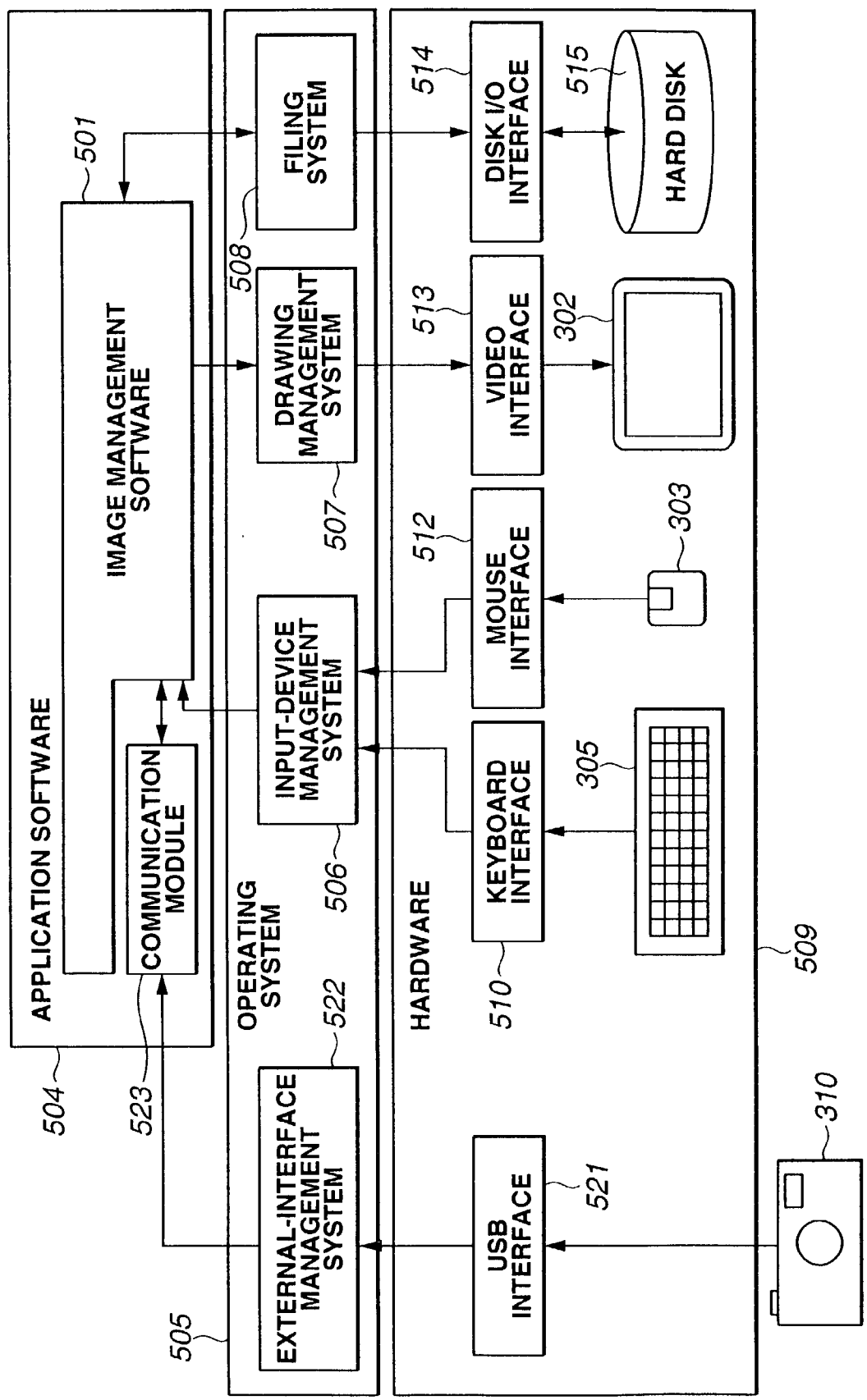

IMAGE MANAGEMENT APPARATUS AND METHOD, RECORDING MEDIUM CAPABLE OF BEING READ BY A COMPUTER, AND COMPUTER PROGRAM

BACKGROUND OF THE INVENTION

1. Field of the Invention

The present invention relates to an image management apparatus, an image management system, an image management method, a recording medium capable of being read by a computer, and a computer program. More particularly, the present invention is suitable when receiving an image from an image input apparatus for inputting a large number of images of a digital camera or the like, managing and displaying the images, and performing printing, transmission by electronic mail, or the like of the images.

2. Description of the Related Art

As a result of recent diffusion of digital cameras, it is common practice to freely photograph a large amount of images, receive and store the images in a personal computer (PC), manage the images by oneself, and print an image or transmit an image by attaching it in mail.

Conventionally, images received from a digital camera connected via a USB (Universal Serial Bus) I/F (interface) or the like are stored within folders, and the received images are managed using image management software that displays each image within a folder assigned by the PC, with a thumbnail size.

In this image management software, in order to manage received images by classifying them, for example, a plurality of subfolders are formed for a superior folder, classified images are stored in each subfolder, and all images in all folders below an assigned folder are directly displayed on a picture frame. As described above, in the conventional image management software, by displaying all images below a certain folder, the user can easily find a desired image, and therefore it is very convenient.

The user's operations when the user photographs images by a digital camera and connects the digital camera to a PC are substantially identical every time.

Furthermore, the user usually intends to perform these operations for newly photographed images. Accordingly, options for an operation which the user intends to perform after receiving images in a PC are not so large.

However, in the above-described conventional image management software, there is no particular connection between an operation of receiving images from a PC and an operation of printing a received image or displaying the images in a slide show. Accordingly, the user must newly select a received image in the PC and start a subsequent operation.

As described above, in the conventional image management software, all images below an assigned folder are directly displayed inclusive of subfolders.

This is an excellent image display method in that the user need not search in which subfolder a desired image is included and can find the desired image by reviewing all displayed images. However, when many images are stored within a folder, the size of each thumbnail image to be displayed becomes relatively small.

The above-described conventional approach of displaying images received from a digital camera into a PC is excellent in finding a desired image when the user can imagine the image in his head. For example, even if a small thumbnail image is displayed as described above, the user can easily find its position because the user who has photographed the image remembers it.

However, when the user intends to vaguely see images, it can be said that this approach is an approach to easily see images, because the size of displayed thumbnail images differs among folders depending on the number of images stored in each folder.

SUMMARY OF THE INVENTION

It is an object of the present invention to solve all or at least one of the above-described problems.

It is another object of the present invention to simplify the user's operation when receiving images from an image input apparatus.

It is still another object of the present invention to allow the user to easily observe images displayed when the user intends to review images received from an image input apparatus.

According to one aspect of the present invention, in an image management apparatus for managing images input from an image input device, when the image input device is connected, options for an operation to be performed are shown to a user. When the user has selected reception of images input from the image input device, the user is also caused to select a type of the images to be received.

According to another aspect of the present invention, an image management apparatus for managing images input from an image input device includes image operation options showing means for showing options for an operation to be performed to a user, when the image input device is connected, operation contents recognition means for recognizing contents of an operation selected by the user from among the options shown by the image operation options showing means, image type options showing means for showing, when the user has selected reception of images, options for a type of the images to be received by the user, in accordance with the contents of the operation selected by the user that have been recognized by the operation contents recognition means, image type recognition means for recognizing the type of the images selected by the user, from among the options shown by the image type options showing means, and image receiving means for receiving images of the type recognized by the image type recognition means from the image input device.

According to still another aspect of the present invention, in an image management method for managing images input from an image input device, when the image input device is connected, options for an operation to be performed are shown to a user. When the user has selected reception of images input from the image input device, the user is also caused to select a type of the images to be received.

According to yet another aspect of the present invention, an image management method for managing images input from an image input device includes an image operation options showing step of showing options for an operation to be performed to a user, when the image input device is connected, an operation contents recognition step of recognizing contents of an operation selected by the user from among the options shown in the image operation options showing step, an image type options showing step of showing, when the user has selected reception of images based on the operation contents recognition step, options for a type of the images to be received by the user, an image type recognition step of recognizing the type of the images selected by the user, from among the options shown in the image type options showing step, and an image receiving step of receiving images of the type recognized in the image-type recognition step.

According to yet a further aspect of the present invention, in a storage medium storing a computer program capable of being read and executed by a computer, the computer program includes an image operation options showing unit for showing options for an operation to be performed to a user, when an image input device is connected, an operation contents recognition unit for recognizing contents of an operation selected by the user from among the options shown by processing of the image operation options showing unit, an image type options showing unit for showing, when the user has selected reception of images based on processing by the operation contents recognition unit, options for a type of the images to be received, an image type recognition unit for recognizing the type of the images selected by the user, from among the options shown in processing by the image type options showing unit, and an image receiving unit for receiving images of the type recognized by processing of the image-type recognition unit.

According to still another aspect of the present invention, a computer program capable of being read and executed by a computer includes an image operation options showing unit for showing options for an operation to be performed to a user, when an image input device is connected, an operation contents recognition unit for recognizing contents of an operation selected by the user from among the options shown by processing of the image operation options showing unit, an image type options showing unit for showing, when the user has selected reception of images based on processing by the operation contents recognition unit, options for a type of the images to be received, an image type recognition unit for recognizing the type of the images selected by the user, from among the options shown in processing by the image type options showing unit, and an image receiving unit for receiving images of the type recognized by processing of the image-type recognition unit.

The foregoing and other objects, advantages and features of the present invention will become more apparent from the following detailed description of the preferred embodiments, taken in conjunction with the accompanying drawings.

BRIEF DESCRIPTION OF THE DRAWINGS

FIG. 11 is a diagram illustrating a dialog for selecting the subsequent operation for a received image, according to the embodiment;

FIG. 16 is a diagram illustrating a file for assigning printing and transfer, according to the embodiment;

FIG. 23 is a block diagram illustrating the configuration of an image management system according to the embodiment.

DETAILED DESCRIPTION OF THE PREFERRED EMBODIMENTS

An image management apparatus and method according to an embodiment of the present invention will now be described with reference to the drawings. In this embodiment, a description will be provided illustrating a case in which the image management apparatus is a personal computer (PC).

First, a description will be provided of a technique that serves as the basis for an image management apparatus, an image management system, and an image management method according to the embodiment.

Figure 1:
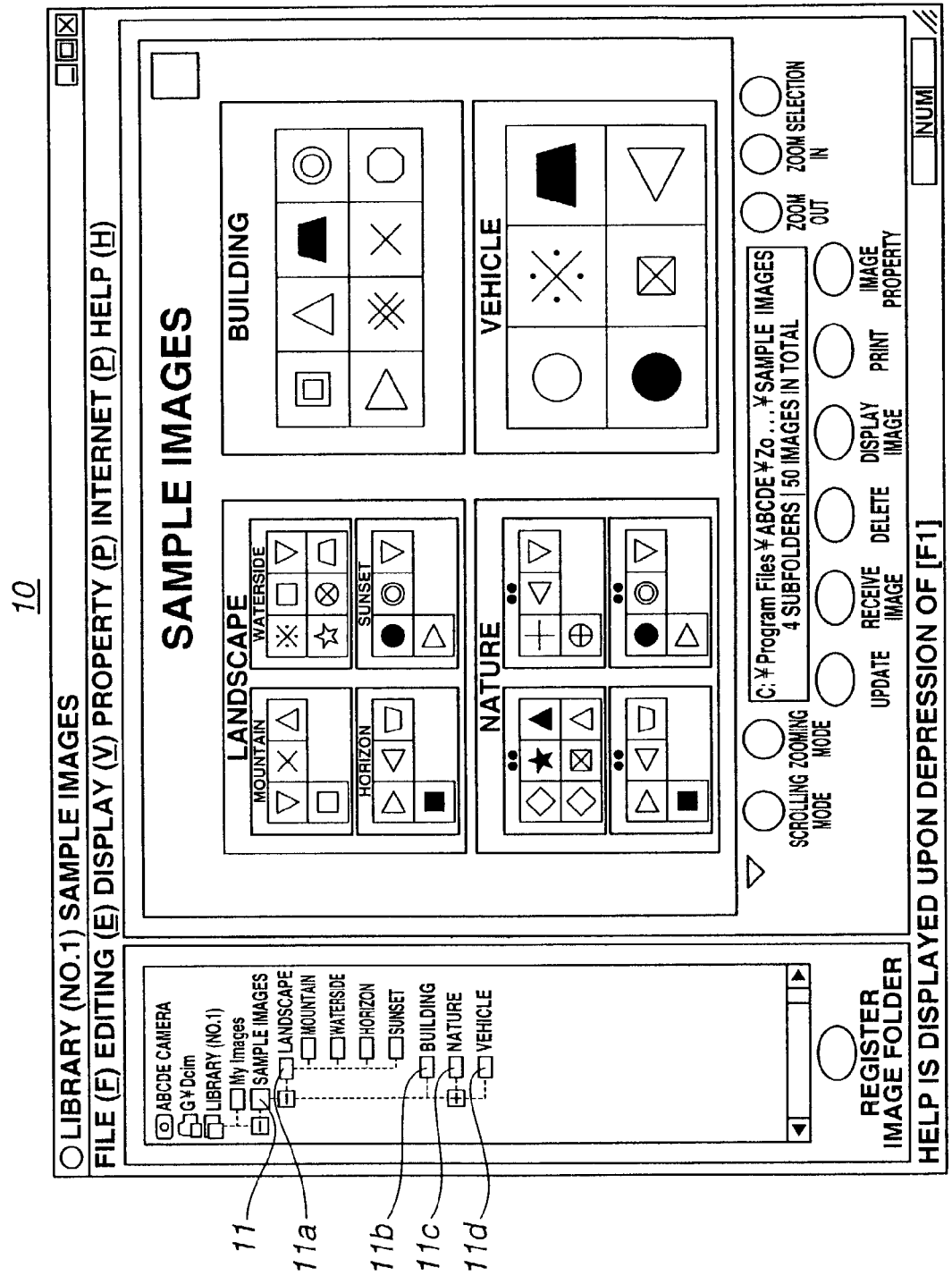
FIG. 1 is a diagram illustrating a display picture frame of images within a PC of image management software according to an embodiment of the present invention.

FIG. 1 is a diagram illustrating a display picture frame of images within a PC provided as an image management apparatus within an image management system. This picture frame is processed by image management software operating in the PC. The image management software can display each image within a folder assigned by the PC with a thumbnail size. This display operation will now be described.

Figure 2:
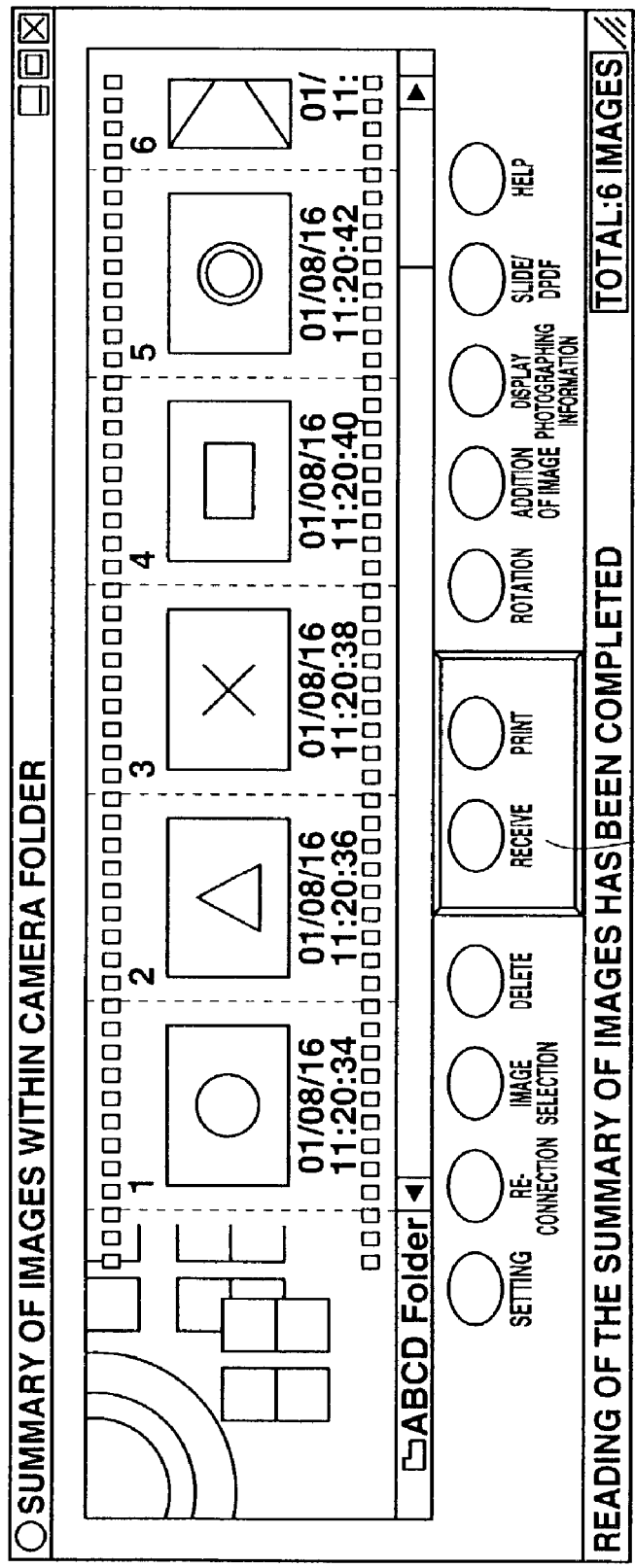
FIG. 2 is a diagram illustrating a display picture frame of images within a camera of image management software according to the embodiment.

When receiving images photographed by a digital camera into the PC, the digital camera is connected via an interface, such as a USB/IF or the like, and each image recorded in a memory card (not shown) within the digital camera is displayed with a thumbnail size, for example, on a window 20 shown in FIG. 2.

The user selects an image to be received into the PC, and depresses a receive button 21. By depressing the receive button 21, the selected image within the camera is transferred to the PC, and the file of the image is stored in a folder assigned from among folders 11a–11d displayed on a window 10 shown in FIG. 1. The corresponding thumbnail image is displayed on the window.

After receiving the image, the user may subsequently perform a certain operation. For example, the user may wish to print the received image, or display the image at a slide show.

Figure 3:
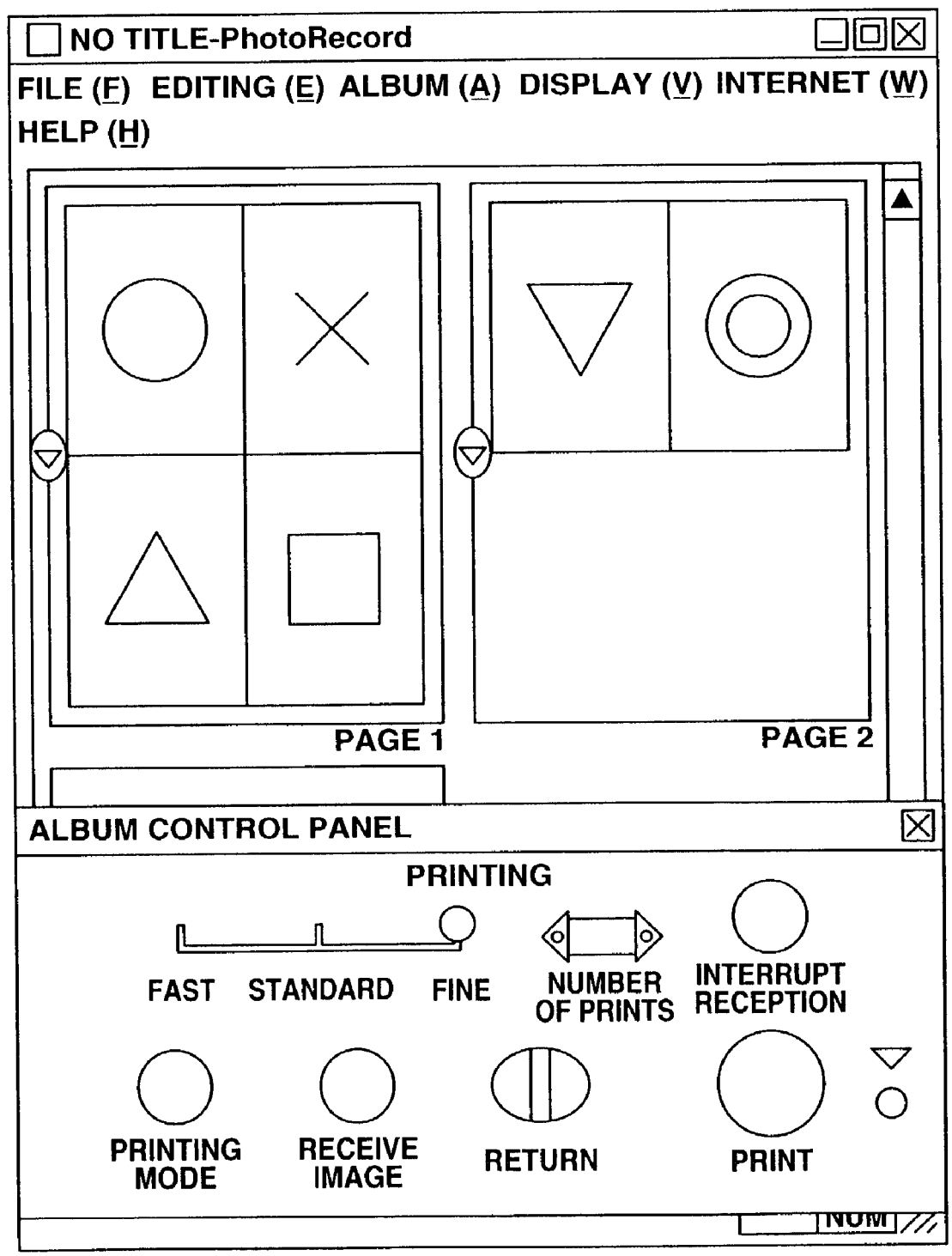
FIG. 3 is a diagram illustrating a picture frame of layout for printing according to the embodiment.
Figure 4:
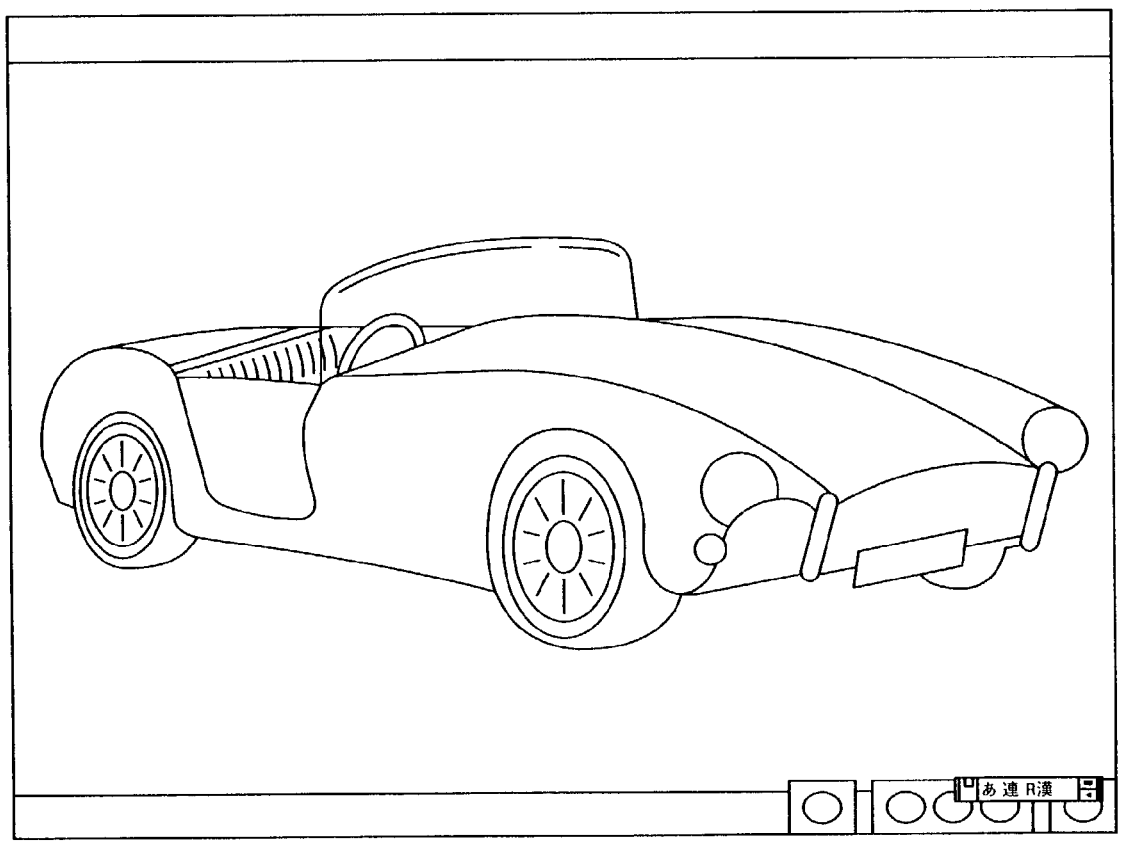
FIG. 4 is a diagram illustrating a picture frame of a slide show according to the embodiment.

In such a case, after selecting the image on the window 10 shown in FIG. 1, the user starts a window 30 for printing shown in FIG. 3, or starts a slide-show picture frame 40 shown in FIG. 4.

The image management software for managing images by displaying the window 10 shown in FIG. 1 displays all images present in all folders 11a–11d below a "sample images" folder 11.

Below the "sample images" folder 11, there are "landscape", "building", "nature" and "vehicle" folders 11a–11d. Below each of the "landscape" folder 11a and the "nature" folder 11c, subfolders are further present.

On the window 10 shown in FIG. 1, all images below the "sample images" folder 11 can be displayed. By double clicking a folder displayed with subfolders on the window 10 shown in FIG. 1, only the concerned folder is displayed by being magnified, and, for example, a window 50 shown in FIG. 5 is displayed.

Figure 5:
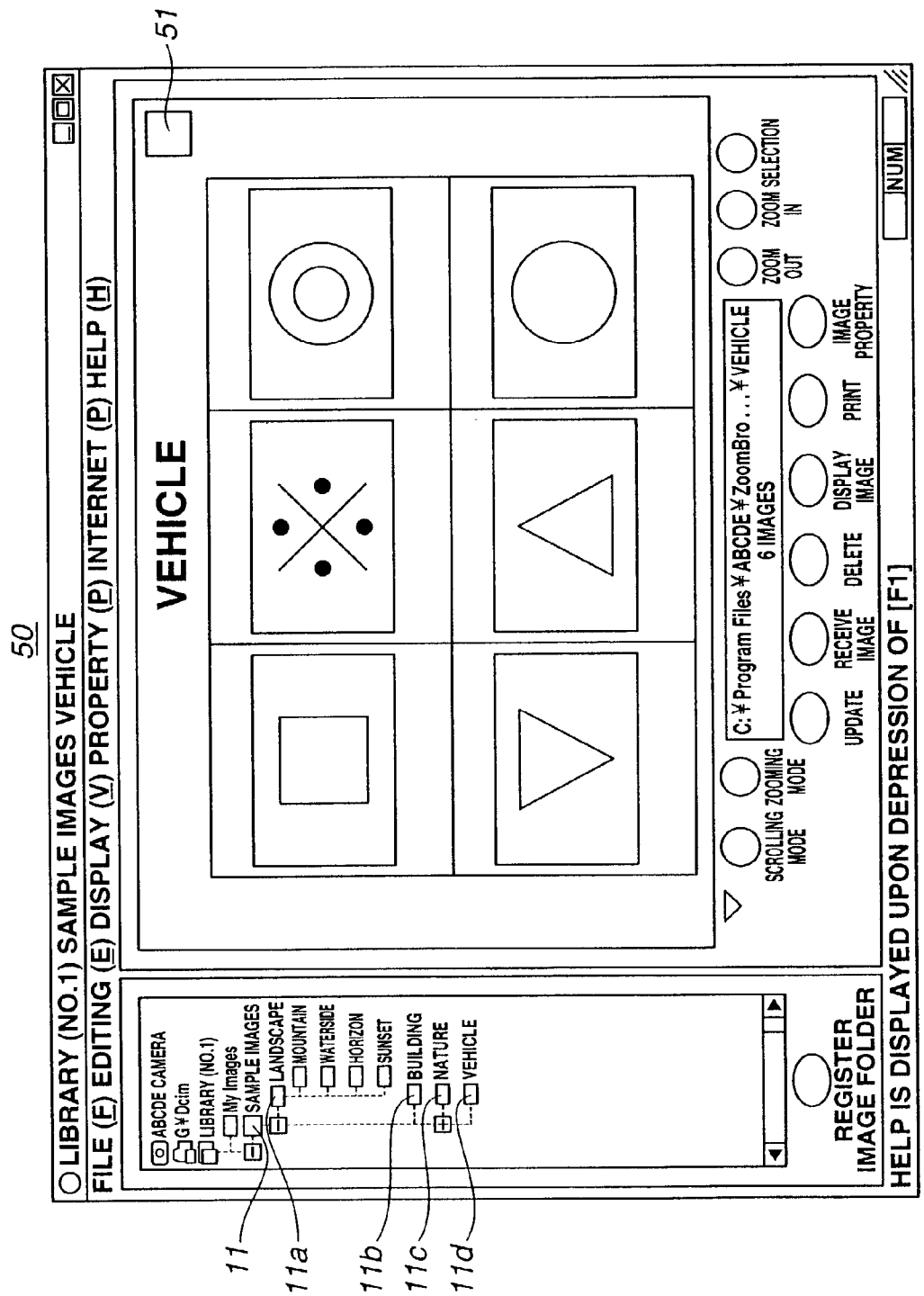
FIG. 5 is a diagram illustrating a picture frame in which images within a folder are displayed by being magnified, according to the embodiment.

By depressing a return button 51 on the window 50 shown in FIG. 5, the state returns to an upper hierarchy, and the window 10 is displayed. By thus displaying all images below a certain folder, a desired image can be easily found out.

Figure 6:
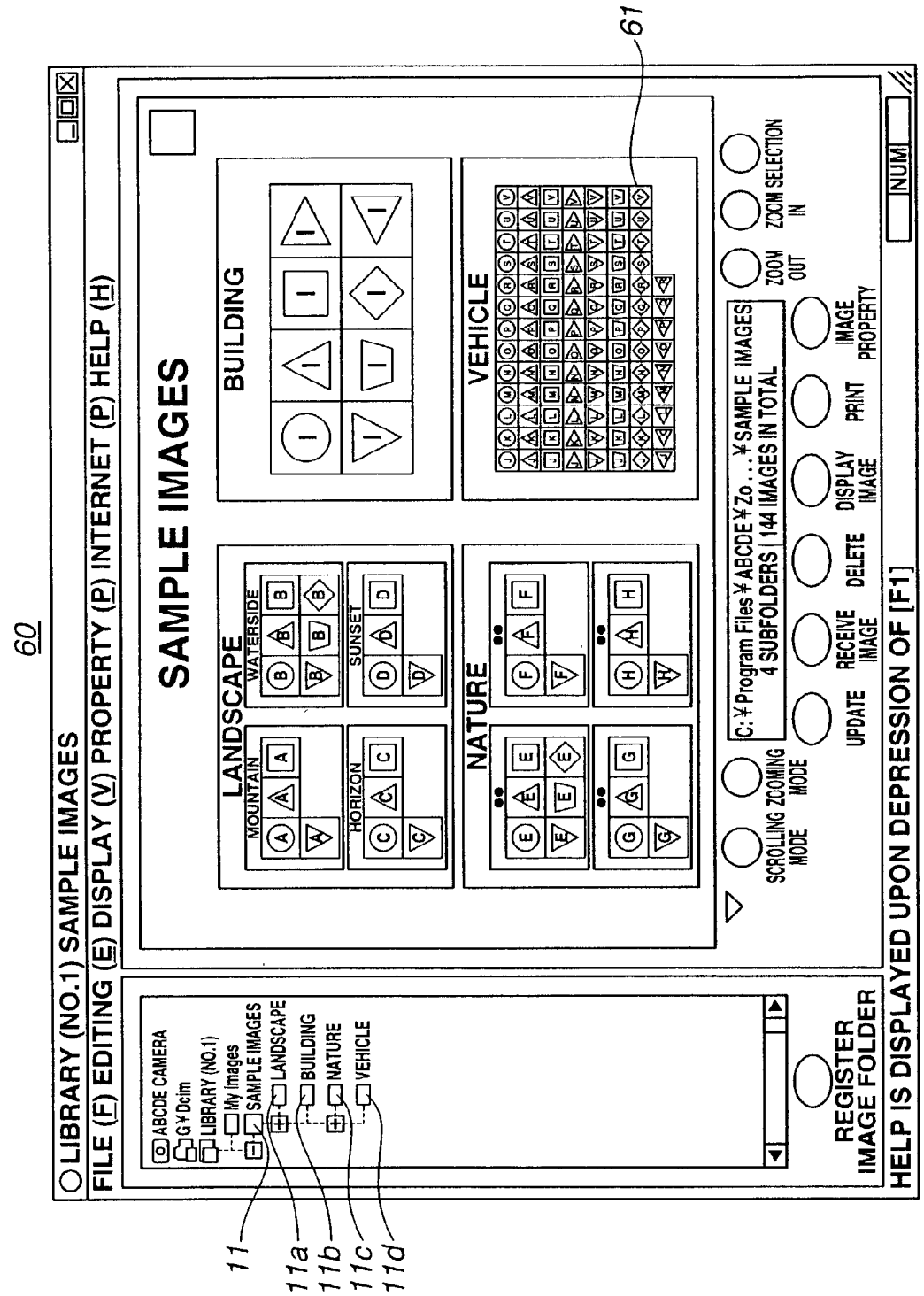
FIG. 6 is a diagram illustrating a picture frame of images within a PC when many images are stored within a folder, according to the embodiment.

When many images are stored in a certain folder as shown in FIG. 6, the size of each thumbnail image displayed on a window 60 becomes relatively small.

Figure 7:
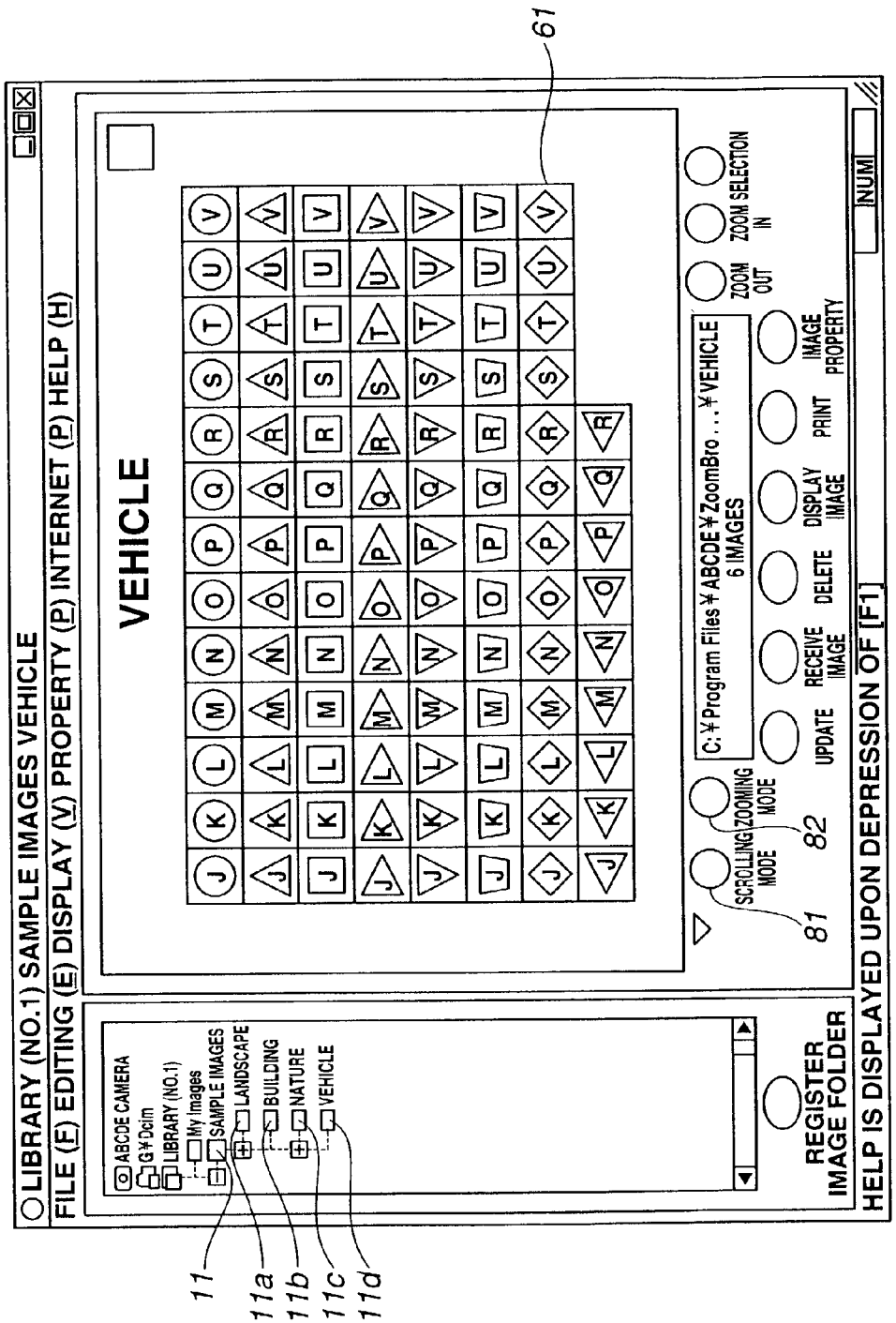
FIG. 7 is a diagram illustrating a picture frame in which many images stored within a folder are displayed by being magnified, according to the embodiment.

Particularly, many images are stored in a "vehicle" folder 61, and therefore the size of each thumbnail image becomes relatively small. FIG. 7 illustrates a window 70 in which this folder is displayed by being magnified by double clicking this folder. In FIG. 7, although the size of each thumbnail image is larger than in FIG. 6, the size in FIG. 7 is nevertheless smaller than that shown in FIG. 5.

Next, an outline of the image management system of the embodiment will be described. First, when the digital camera is connected via a interface, such as a USB I/F or the like, the image management system of the embodiment is automatically started by detecting the connection.

Figure 9:
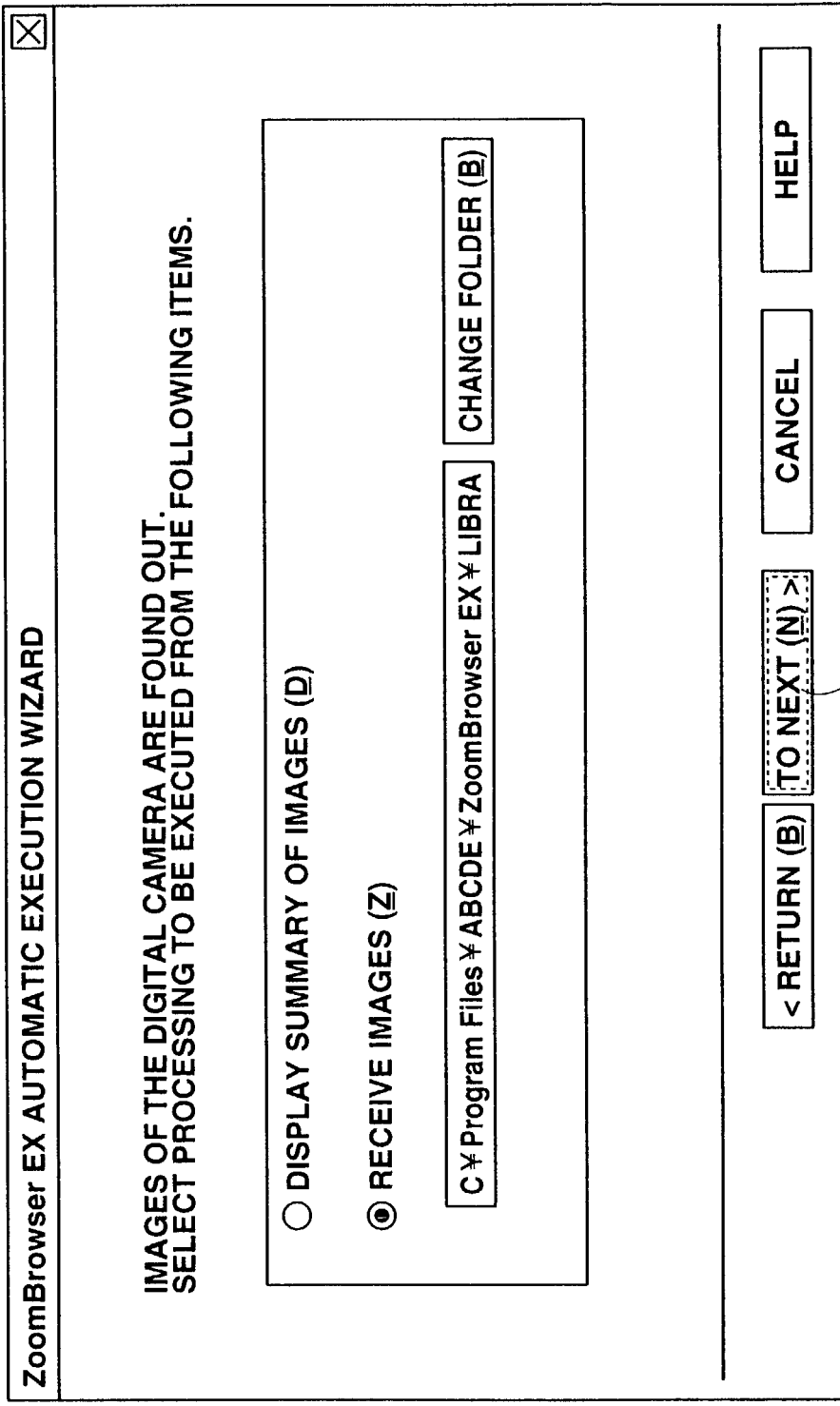
FIG. 9 is a diagram illustrating a dialog for selecting images, according to the embodiment.

The main body of the PC, serving as the image management apparatus of the embodiment, displays a dialog 90 shown in FIG. 9. If "Display Summary of Images" within the dialog 90 is selected, the window 20 for displaying images within the camera shown in FIG. 2 is displayed. This window 20 is hereinafter termed a "camera window".

The user can select an image to be received, or perform processing other than image reception, such as setting of a time in the camera, deletion of an image within the camera, or the like. If "Receive Images" within the dialog 90 is selected, a folder is assigned for reception of images.

As described above, the process of receiving images into the PC is performed by image reception means whose program is provided by the computer system of the PC.

Figure 10:
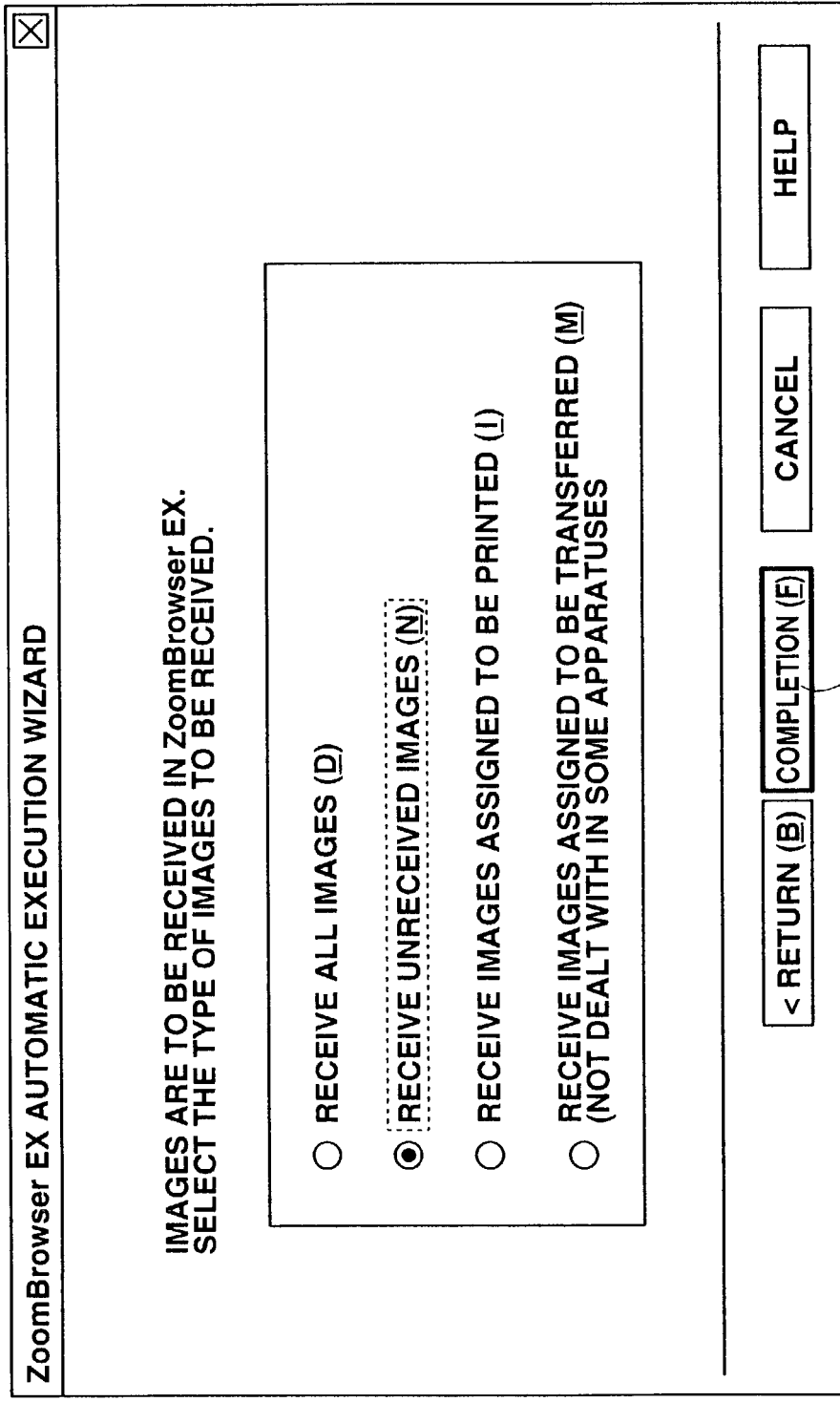
FIG. 10 is a diagram illustrating a dialog for selecting the type of images to be received, according to the embodiment.

By depressing a "To Next" button 91, a dialog 100 shown in FIG. 10 is displayed. In this dialog 100, images to be received are selected.

By depressing a "Completion" button 101, reception of assigned images is executed. Upon completion of image reception, a dialog 110 shown in FIG. 11 is displayed. In this dialog 110, the subsequent operation for the received images can be set. Each of these dialogs 90, 100 and 110 when connecting the camera is hereinafter termed an "automatic execution wizard".

The above-described process of showing options for an operation for a received image and recognizing the contents of the selected operation is performed by image operation options showing means and image operation contents recognition means whose programs are provided by the computer system of the PC.

When an automatic execution wizard has been once executed, the PC, serving as the image management apparatus provided in the image management system of the embodiment, stores the contents of the processing.

Figure 12:
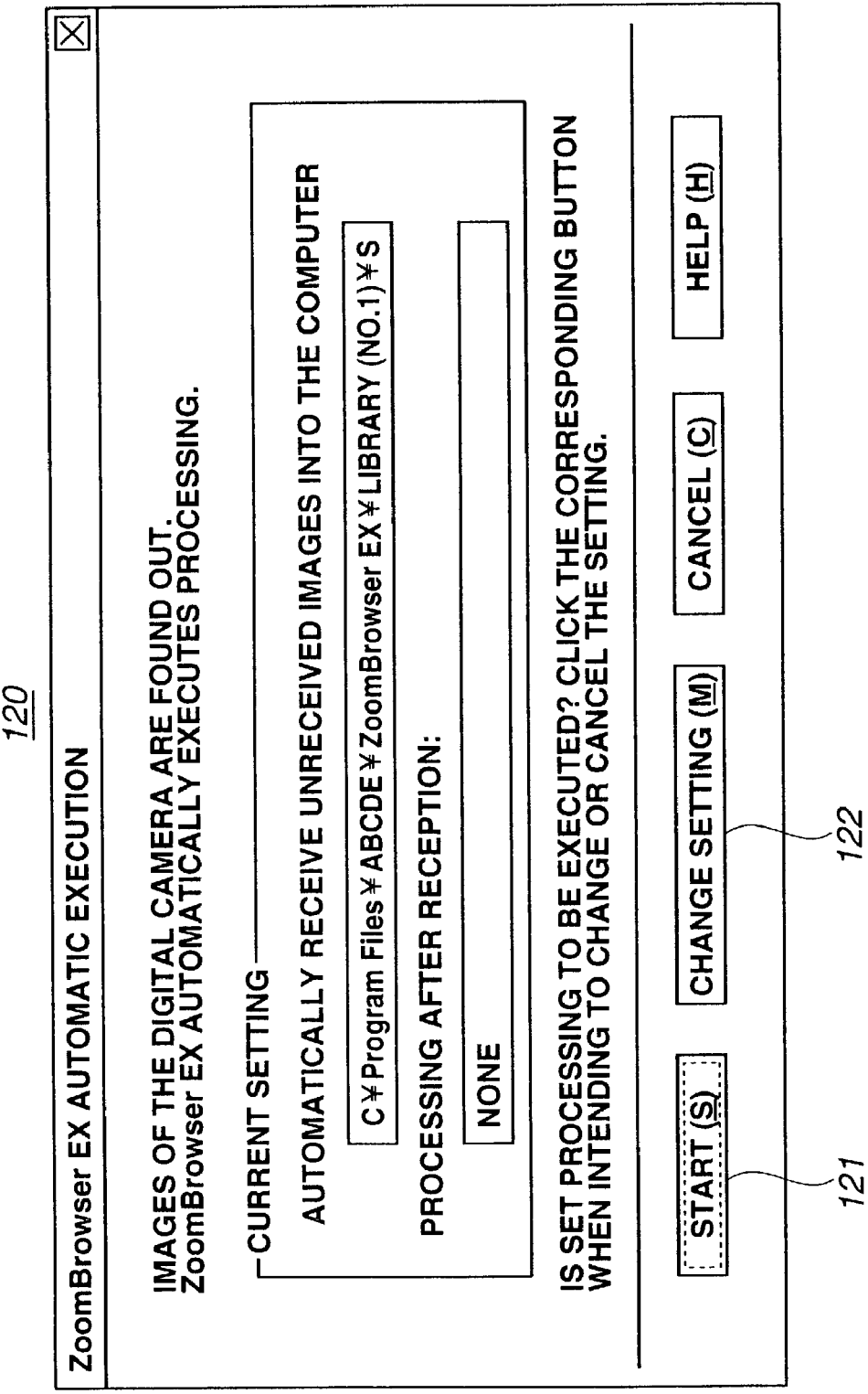
FIG. 12 is a diagram illustrating a dialog for indicating the immediately preceding processing to the user, according to the embodiment.

When the camera is again connected to the PC, a dialog 120 shown in FIG. 12 is displayed to show the immediately preceding process to the user, and to cause the user to select to perform a process different from the immediately preceding process.

Such process of executing an automatic execution wizard and storing the contents of the processing selected by the user is performed by selected-contents storage means whose program is provided by the computer system of the PC. The process of displaying the dialog 120 is performed by selection-content showing means and reoperation options showing means whose program is provided by the computer system of the PC.

If it is only necessary to perform the same process as the previous process, the contents of the previously executed process are executed only by depressing a "Start" button 121. If it is intended to perform a process different from the previous process, a "Change Setting" button 122 is depressed. Then, the dialog 90 shown in FIG. 9 is displayed, and the contents of automatic execution can be assigned.

The above-described process of executing the same contents as the immediately preceding contents is performed by same-contents execution means whose program is provided by the computer system of the PC.

When storing the contents selected by the user, it is recommended to also store information for specifying the image input apparatus, such as the number of the connected apparatuses, information relating to the type of the apparatus, and the like, and information relating to the user. When an image input apparatus is connected to the PC, it is determined whether or not the previously selected contents are stored in the selected-contents storage means, based on the information for specifying the image input apparatus and information relating to the user. If the apparatus stores the previously set contents, the contents are shown to the user. This approach is convenient, for example, when a plurality of users use a common PC, because common processing is frequently performed by the users. Furthermore, it is possible to prevent another user from setting contents different from the contents previously selected by the previous user.

Figure 8:
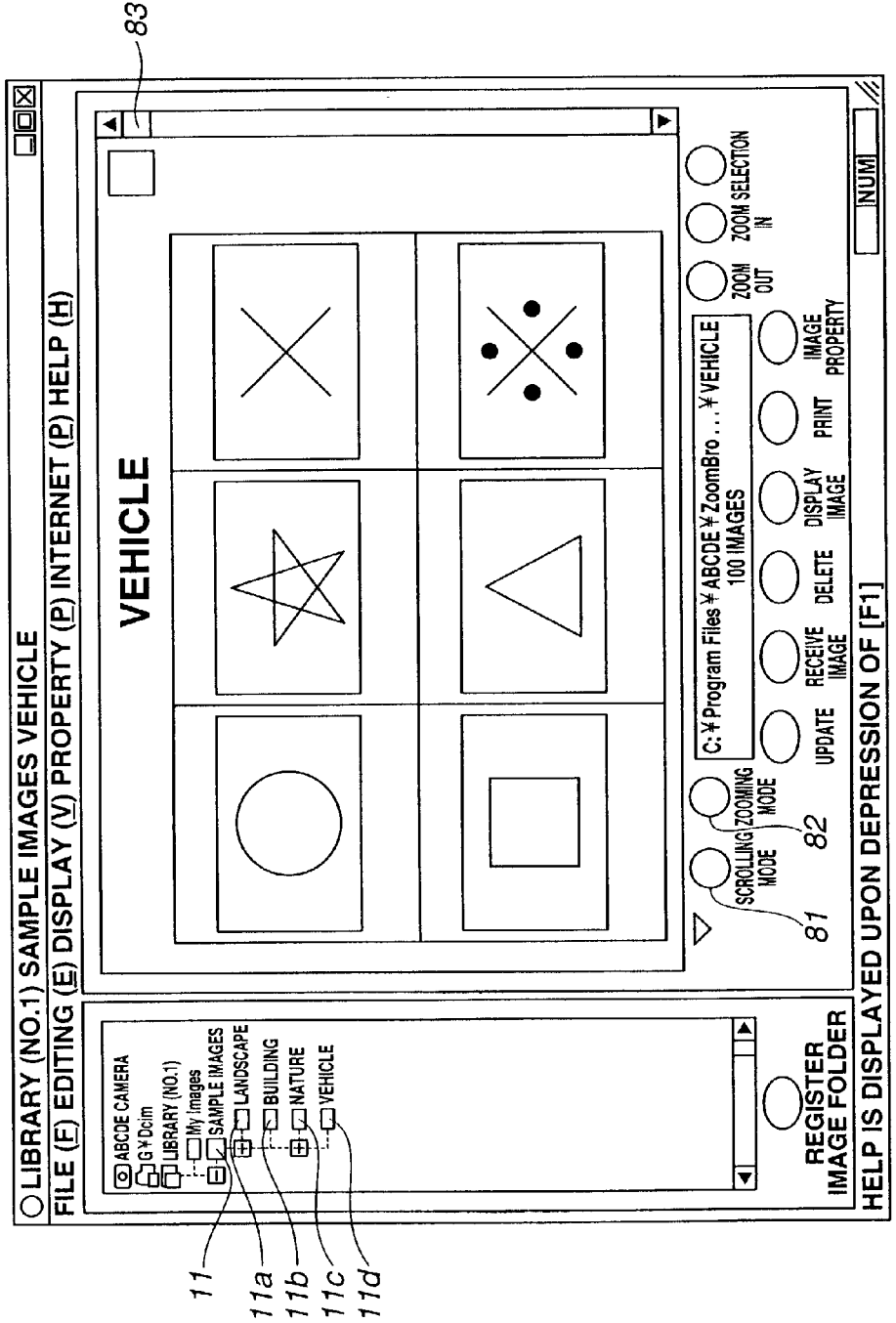
FIG. 8 is a diagram illustrating a picture frame in which thumbnail images are displayed with a fixed size, according to the embodiment.

FIG. 8 illustrates a picture frame for displaying images within a folder with a fixed size of thumbnail images. By depressing a "scrolling mode" button 81 on a display picture frame shown in FIG. 7, the picture frame is switched to a picture frame 80 shown in FIG. 8, in which thumbnail images are displayed with a fixed size.

Since all images stored in a "vehicle" folder 11*d* cannot be displayed, a scrolling bar 83 appears at the right. Such a display mode is hereinafter termed a "scrolling mode".

This process of displaying the picture frame 80 in the scrolling mode is performed by a fixed-size image display means whose program is provided by the computer system of the PC.

By depressing a "zooming mode" button 82, the mode shifts from the scrolling mode to a mode of displaying all images, and the display picture frame 70 shown in FIG. 7 is displayed. This mode is hereinafter termed a "zooming mode". By performing this switching, a method of reviewing images adapted to the user's intention is realized.

This process of displaying the picture frame 70 in the zooming mode is performed by all images display means whose program is provided by the computer system of the PC. The process of performing switching between display in the zooming mode and display in the scrolling mode is performed by display-contents switching means whose program is provided by the computer system of the PC.

Figure 22:
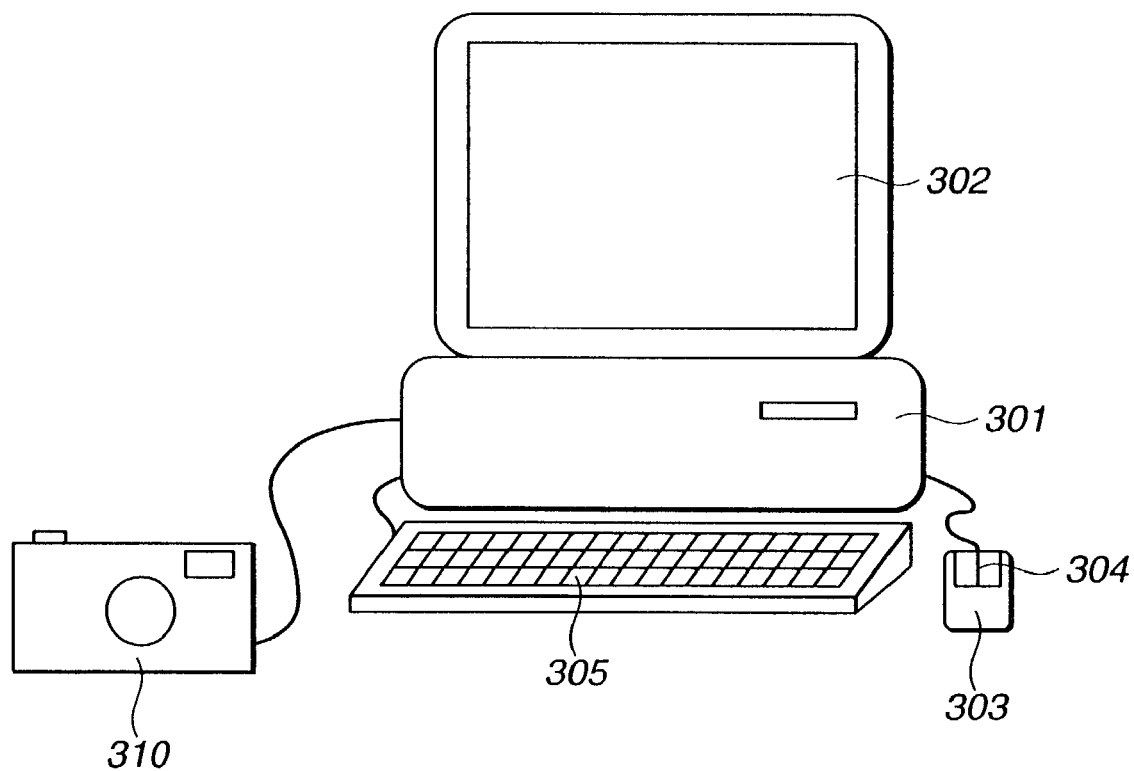
FIG. 22 is a diagram illustrating a configuration of a personal computer system in which a camera is connected to a computer, according to the embodiment.

FIG. 22 is a diagram illustrating a configuration of a personal computer system, serving as a platform in which this embodiment can be executed.

In FIG. 22, there are shown a computer-system main body 301, a display 302 for displaying data, a mouse 303, serving as a pointing device, mouse buttons 304, and a keyboard 305. A digital camera 310 serves as an image input apparatus, and is connected to the computer-system main body 301 via a communication cable, such as a USB cable or the like.

FIG. 23 is a diagram illustrating the configuration of the image management system of the embodiment that includes software and hardware. In FIG. 23, there are shown hardware 509, an operating system (OS) 505 operating in the hardware 509, and application software 504 operating in the OS 505.

Among blocks constituting the hardware 509 and the OS 505, blocks that are not directly required for describing the features of the image management system of the embodiment are not illustrated.

Such blocks include a CPU (central processing unit), a memory and the like in the hardware 509, and a memory management system and the like in the OS 505.

In FIG. 23, a hard disk 515 physically stores files and data. A filing system 508 is included in the OS 505, and has the function of allowing the application software 504 to input/output files without being aware of the hardware 509.

A disk I/O interface 514 allows the filing system 508 to perform read/write data from/on the hard disk 515. A drawing management system 507 is included in the OS 505, and has the function of allowing the application software 504 to perform drawing without being aware of the hardware 509.

A video interface 513 allows the drawing management system 507 to perform drawing on the display 302. An input-device management system 506 is included in the OS 505, and has the function of allowing the application software 504 to receive the user's input without being aware of the hardware 509.

A keyboard interface 510 allows the input-device management system 506 to receive an input from the keyboard 305. A mouse interface 512 allows the input-device management system 506 to receive an input from the mouse 303.

The digital camera 310 serves as an image input apparatus, and is connected via a communication cable, such as a USB cable or the like, in this embodiment. An external-interface management system 522 manages the digital camera 310 via a USB interface 521.

A communication module 523 communicates with the external-interface management system 522. Image management software 501 exchanges image data and information with the camera 310 using the communication module 523.

Figure 21:
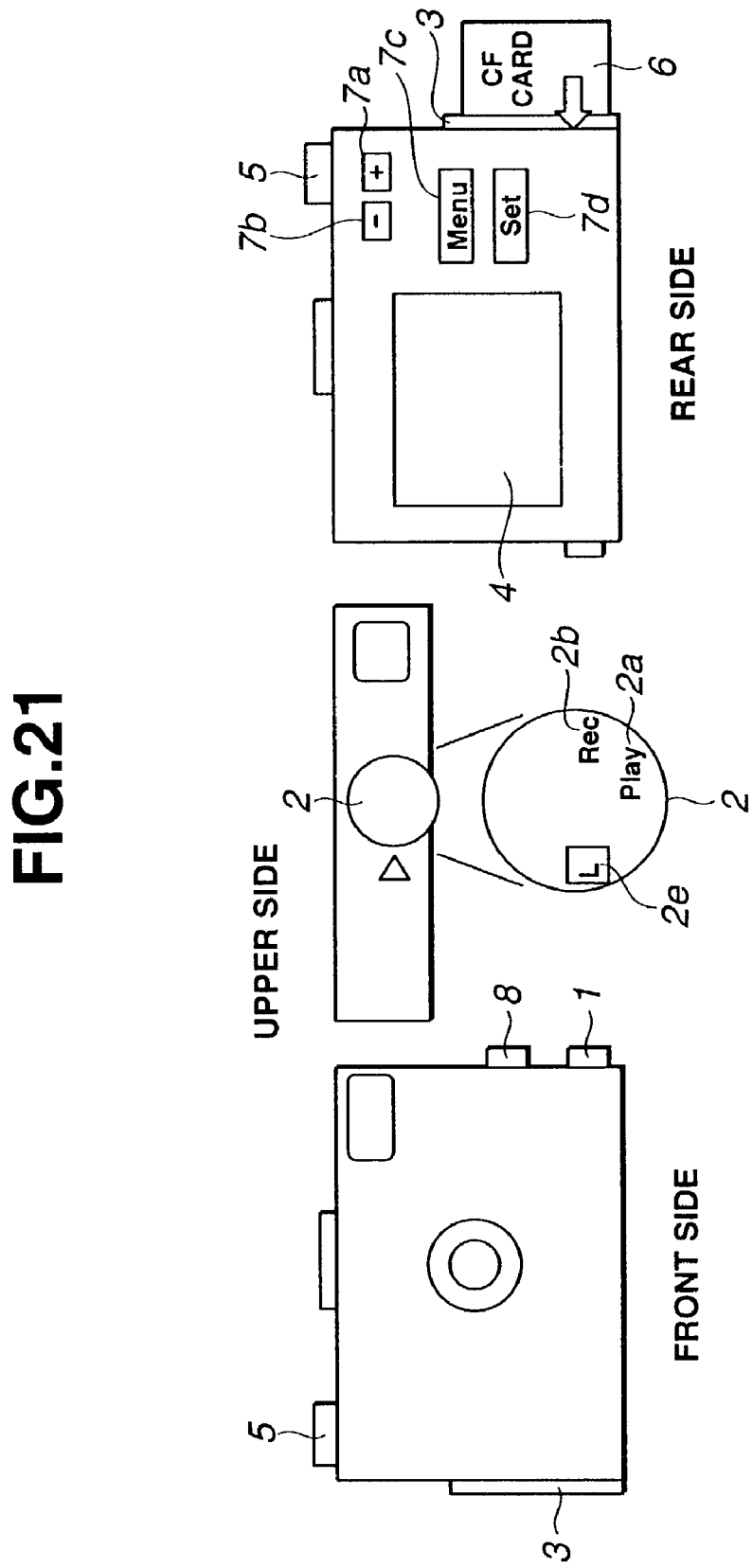
FIG. 21 is a diagram illustrating an external appearance of a digital camera.

FIG. 21 illustrates an external appearance of the digital camera 310. In FIG. 21, a USB interface (I/F) 1 is connected to the computer-system main body 301 (not shown). A mode dial switch 2 has the function of instructing a desired operation by adjusting the dial of the mode dial switch 2 to a reproduction mode (Play) 2*a,* a photographing mode (Rec) 2*b,* or a power supply "Off" mode 2*e* by rotating the dial. There is also shown a CF (Compact Flash™) card slot 3.

When using only the main body of the camera 310, the dial of the mode dial switch 2 is rotated from the power supply "Off" to another mode, in order to turn on the power supply and assume the concerned mode.

In the photographing mode 2*b*, a preview of an image is displayed on an LCD (liquid-crystal display) 4. The image is photographed by depressing a release switch 5, and is recorded in a CF card 6.

In the reproduction mode 2*a*, the latest photographed and recorded image is displayed on the LCD 4. Recorded images are sequentially transferred and reproduced using a "+" button 7*a* or a "−" button 7*b*.

A menu is displayed on the LCD 4 using a Menu button 7*c*. A menu item can be selected using the "+" button 7*a* or the "−" button 7*b*, and can be set using a "Set" button 7*d*.

When the digital camera 310 is connected to the computer-system main body 301 via a USB interface (I/F) or the like, the image management apparatus of the embodiment is automatically started by detecting the connection.

The PC, serving as the image management apparatus of the embodiment, displays the dialog 90 shown in FIG. 9. When "Display Summary of Images" within the dialog 90 is selected, the camera window 20 shown in FIG. 2 is displayed.

On the camera window 20, the user can select an image to be received, or perform processing other than image reception, such as setting of a time in the camera 310, deletion of an image within the camera, or the like.

If "Receive Images" within the dialog 90 is selected, a folder is assigned for reception of images. If a "reference" button (not shown) is depressed, a folder selection dialog is displayed, and the user can change a folder where the image is to be stored.

The above-described process of displaying the dialog 90 in order to show options for an operation to be executed by the user and recognizing the contents of the selected operation is performed by image operation options showing means and image operation contents recognition means whose programs are provided by the computer system of the PC.

By depressing the "To Next" button 91, the dialog 100 shown in FIG. 10 is displayed. In this dialog 100, the type of images to be received is selected. One of four processing options, i.e., ""Receive all images", "Receive unreceived images", "Receive images assigned to be printed", and "Receive images assigned to be transferred", can be selected.

The above-described process of displaying the dialog 100 in order to show options for an operation for selecting the type of images to be received and recognizing the contents of the selected operation is performed by image type options showing means and image type recognition means whose programs are provided by the computer system of the PC.

By depressing a "Completion" button 101, reception of assigned images is executed. A folder is formed below the assigned folder in accordance with the date of the photographing operation for the received images, and the received image files are stored in the formed folder.

Figure 13:
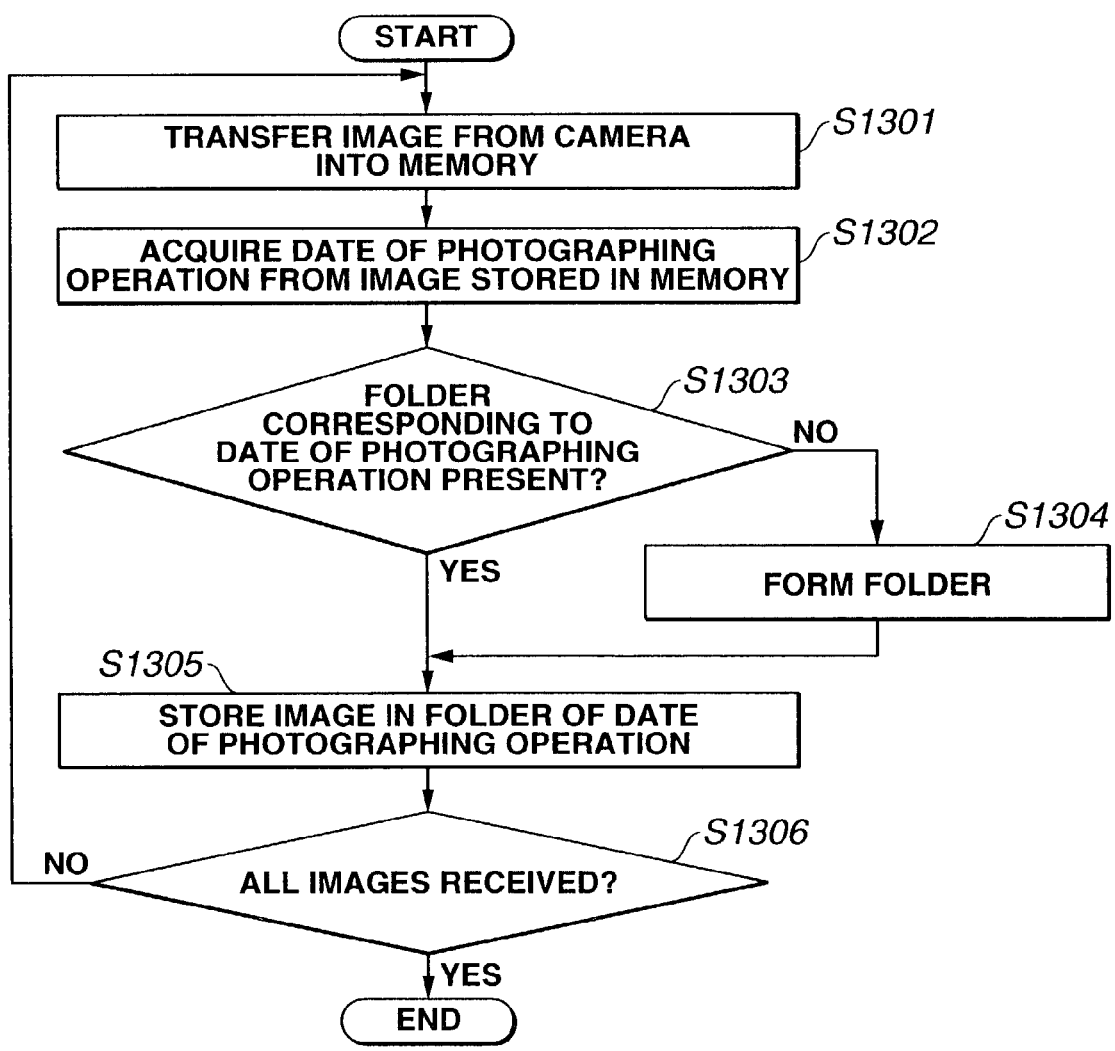
FIG. 13 is a flowchart illustrating a procedure for forming a folder in accordance with the date of an operation of photographing received images, and storing files of the received images in the folder, according to the embodiment.

FIG. 13 illustrates this operation. First, in step S1301, an image in the camera 310 is transferred into a memory of the PC main body 301.

Then, in step S1302, data relating to the recorded date of the photographing operation is acquired from the header portion of the image. Then, in step S1303, it is determined whether or not a folder corresponding to the acquired date of the photographing operation is present below the assigned folder. For example, if the date of the photographing operation is Dec. 10, 2000, it is determined whether or not a folder of 2000_12_10 is present.

If the result of the determination in step S1303 is negative, then, in step S1304, a folder of "2000_12_10" is formed. The process in step S1304 is performed by folder forming means whose program is provided by the computer system of the PC.

Then, in step S1305, the image stored in the memory is held in the folder of "2000_12_10". The process in step S1305 is performed by image storage means whose program is provided by the computer system of the PC.

By confirming in step S1306 whether or not all images up to the final image have been received by repeating the above-described process, all images are held in the PC main body 310 by being automatically classified for each respective date of a photographing operation.

Instead of forming folders for respective dates of photographing operations, folders may be formed for respective dates of reception of images.

Next, a description will be provided of a procedure for receiving images for each of cases of "Receive all images", "Receive unreceived images", "Receive images assigned to be printed", and "Receive images assigned to be transferred" selected in the dialog 100 shown in FIG. 10.

Figure 14:
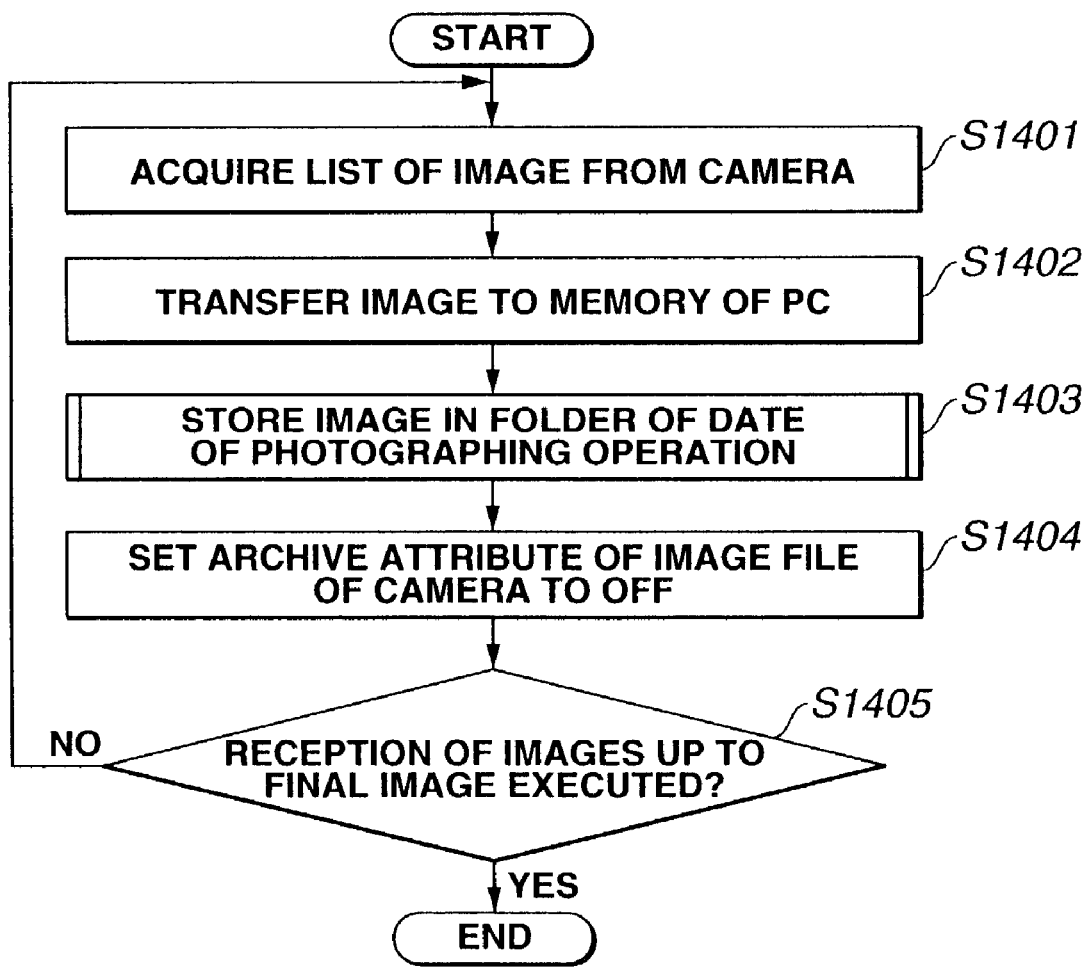
FIG. 14 is a flowchart illustrating a procedure for receiving all images, according to the embodiment.

First, FIG. 14 illustrates a procedure for receiving images in the case of "Receive all images". First, in step S1401, the list of images recorded in a memory card of the camera 310 is acquired from the camera 310.

Then, in step S1402, the first image in the list is transferred to the memory of the PC main body 301. Then, in step S1403, the image is held as a file according to the folder forming procedure shown in FIG. 13.

Then, in step S1404, an instruction is provided to the camera 310 so that the archive attribute of that file is set to "Off". An image whose file has an archive attribute of "Off" indicates an already received image. In step S1405, it is determined whether or not all images have been received up to the final image.

Figure 15:
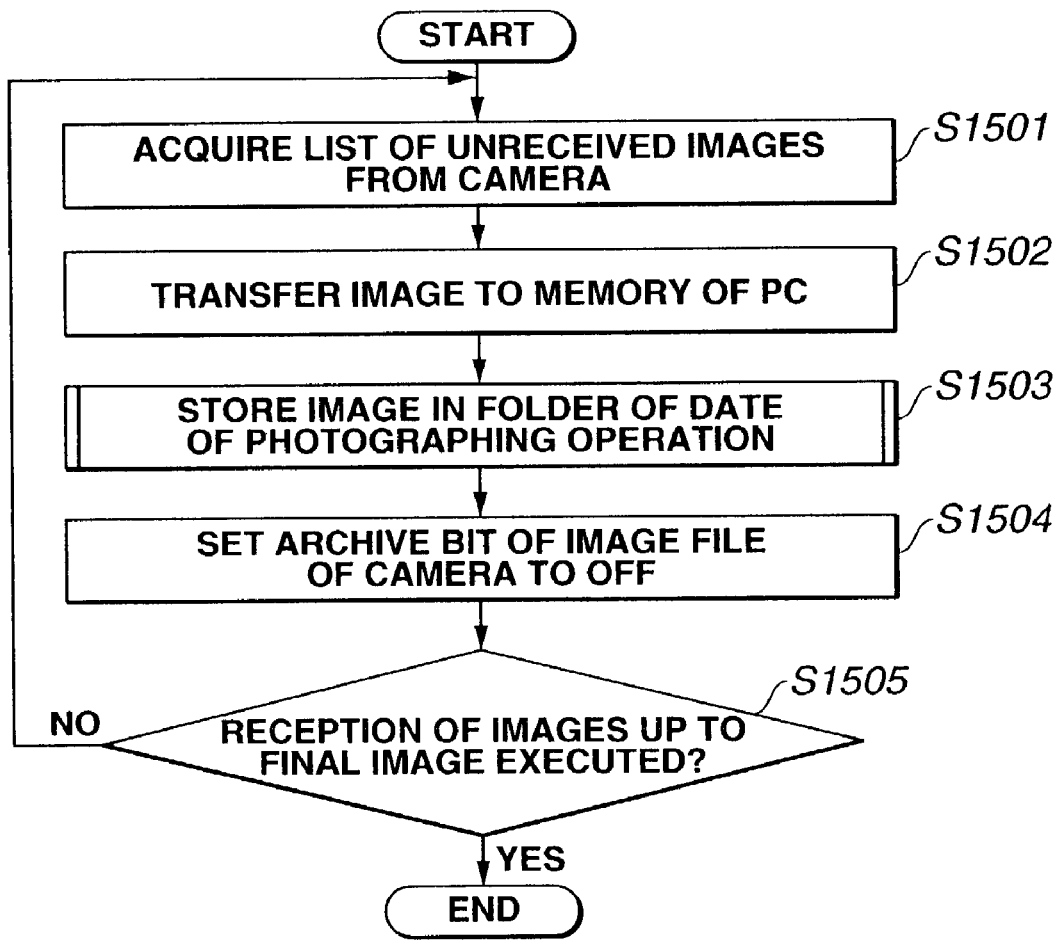
FIG. 15 is a flowchart illustrating a procedure for receiving unreceived images, according to the embodiment.

Next, FIG. 15 illustrates a procedure for receiving images in the case of "Receive unreceived images". This procedure differs from the above-described procedure of the flowchart shown in FIG. 14 only in step S1501, where the list of only those images whose archive attribute is set to "On" is received from the camera 310. Thus, only unreceived images are received.

Next, a description will be provided of a procedure for "Receive images assigned to be printed". In the camera 310, a mark can be attached to an image to be printed by an operation on the main body of the camera 310 in the reproduction mode.

The mode dial switch 2 shown in FIG. 21 is adjusted to the reproduction mode 2a, and a menu is displayed on the LCD 4 by depressing the "Menu" button 7c.

"Assignment of Printing" is selected from the menu, images are fed using the "+" button 7a or the "−" button 7b, and an image to be marked is assigned using the "Set" button 7d. According to this operation, a Print/Transfer Mark file 160 for assigning printing and transfer shown in FIG. 16 is obtained within the camera 310. Image files 160a1 written in a [Print Mark] section 160a shown in FIG. 16 are assigned to be printed.

Figure 17:
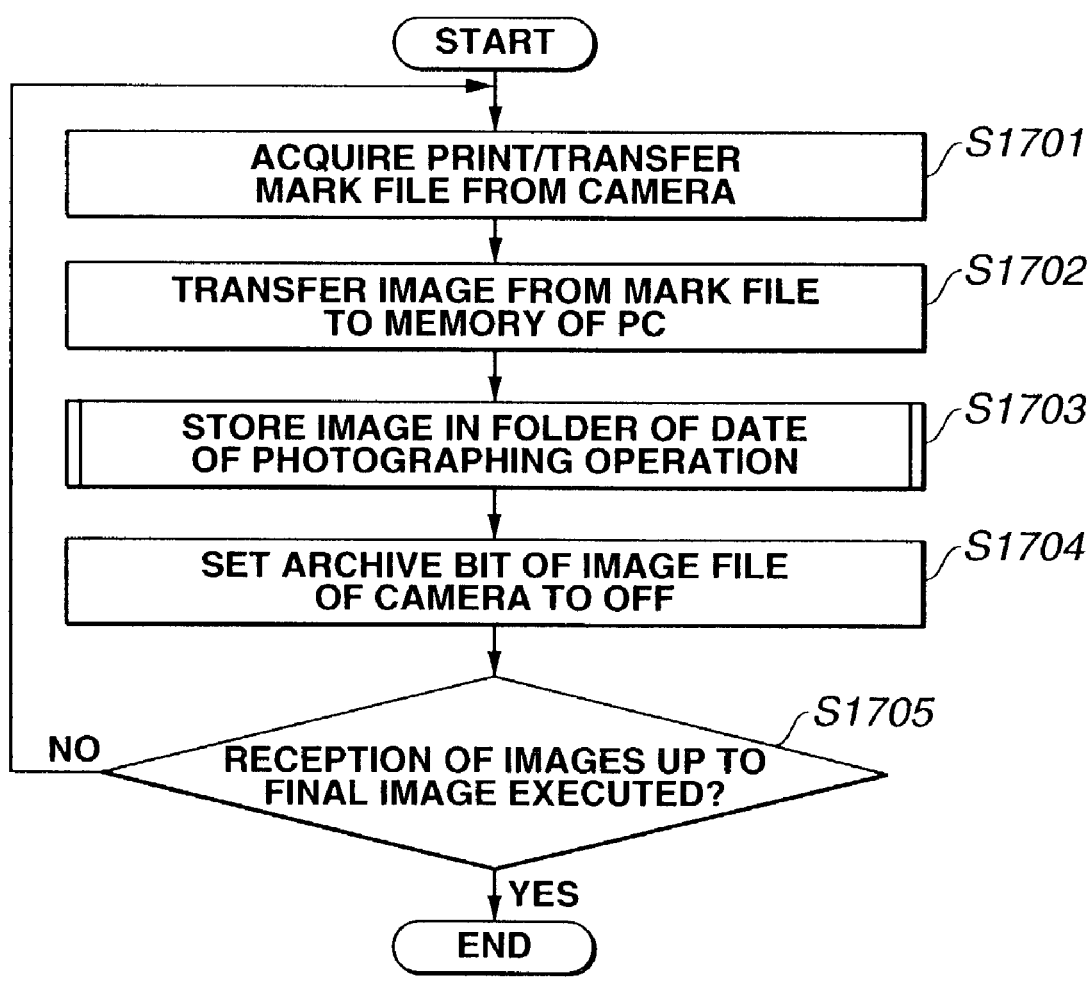
FIG. 17 is a flowchart illustrating a procedure for receiving an image assigned to be printed and transferred, according to the embodiment.

FIG. 17 illustrates a procedure for receiving images in the case of "Receive images assigned to be printed". First, in step S1701, a Print/Transfer Mark file 160 is acquired. Then, in step S1702, image files 160a1 written in the [Print Mark] section 160a are sequentially transferred to the PC-system main body 301. The subsequent processing is the same as the above-described processing of steps S1403–S1405 shown in FIG. 14.

A procedure for receiving images in the case of "Receive images assigned to be transferred" is identical to the above-described one. Images assigned to be transferred in the menu of the camera 310 are written in a [Transfer Mark] section 160b of the Print/Transfer Mark file 160 shown in FIG. 16.

The Print/Transfer Mark file 160 is acquired in the above-described step S1701 shown in FIG. 17. Then, in step S1702, image files 160b1 written in the [Transfer Mark] section 160b are sequentially transferred to the PC-system main body 301. The subsequent processing is the same as the above-described processing of steps S1403–S1405 shown in FIG. 14.

Upon completion of image reception in the above-described manner, the dialog 110 shown in FIG. 11 are displayed. The subsequent operation for the received images can be successively set.

Accordingly, the user can successively perform the subsequent operation without newly selecting an image received from the digital camera 310 into the PC system main body 301. As a result, the operation for images received from the digital camera 310 is simplified.

In this embodiment, as shown in FIG. 11, a case, in which the subsequent operation for the received images can be selected from among "Display slide show", "Perform layout printing", "Perform index printing", "Form electronic mail", and "Upload in on-line photoservice", is illustrated. The selection of the operation is not necessarily performed after execution of image receiving processing, but may optionally be performed before execution of image receiving processing.

When an automatic execution wizard has been once executed, the image management system stores the contents of execution. When the camera 310 is connected to the PC-system main body 301, the contents of previous execution shown in FIG. 12 are shown to the user.

If it is only necessary to perform the same process as the immediately preceding process, the process is executed only by depressing a "Start" button 121. When indenting to perform a process different from the immediately preceding process, a "Change Setting" button 122 is depressed. Then, the dialog 90 shown in FIG. 9 is displayed, and the contents of automatic execution can be newly assigned.

Figure 18:
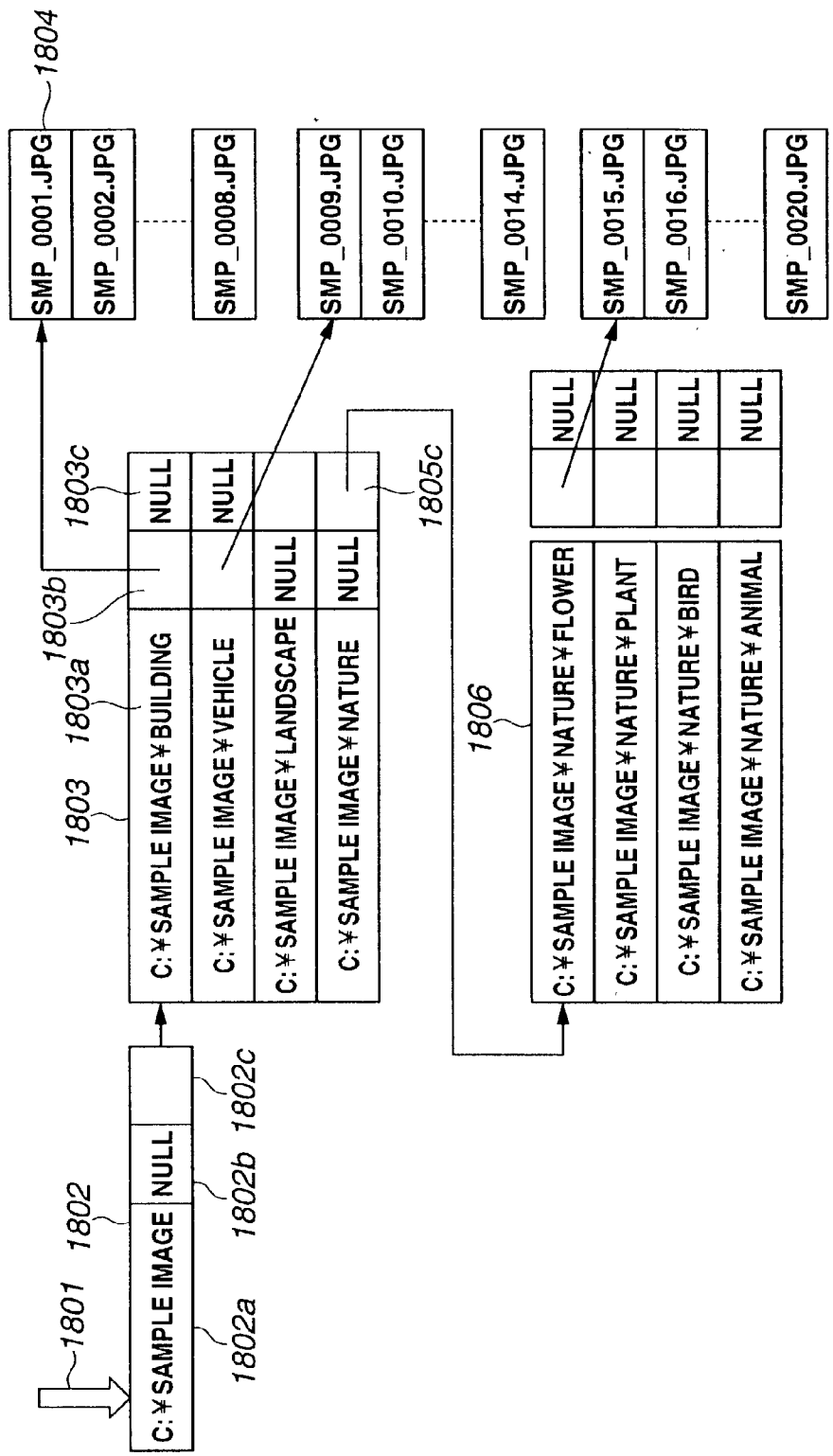
FIG. 18 is diagram illustrating a data structure for managing images, according to the embodiment.

FIG. 18 illustrates a data structure for performing display in the zooming mode and the scrolling mode. Reference numeral 1801 represents a pointer seen when display is performed. Reference numeral 1802 represents a structure in units of a folder. The pass name of the folder is stored in a folder pass 1802a.

Reference numeral 1802b represents a pointer for an image-file-name structure within the folder. Since an image file is absent in a "C:¥ Sample Image" folder, the pointer is represented as "null".

Reference numeral 1802c represents a pointer for a subfolder. The pointer 1802c indicates a structure 1803 in units of a subfolder. The structure 1803 includes the pass name 1803a of the folder, a pointer 1803b for an image-file-name structure 1804, and a pointer 1803c for a lower-hierarchy subfolder (null because such a subfolder is absent).

Reference numeral 1805c represents a pointer when subfolders are further present. The pointer 1805c indicates a structure 1806 in units of such a subfolder.

Figure 19:
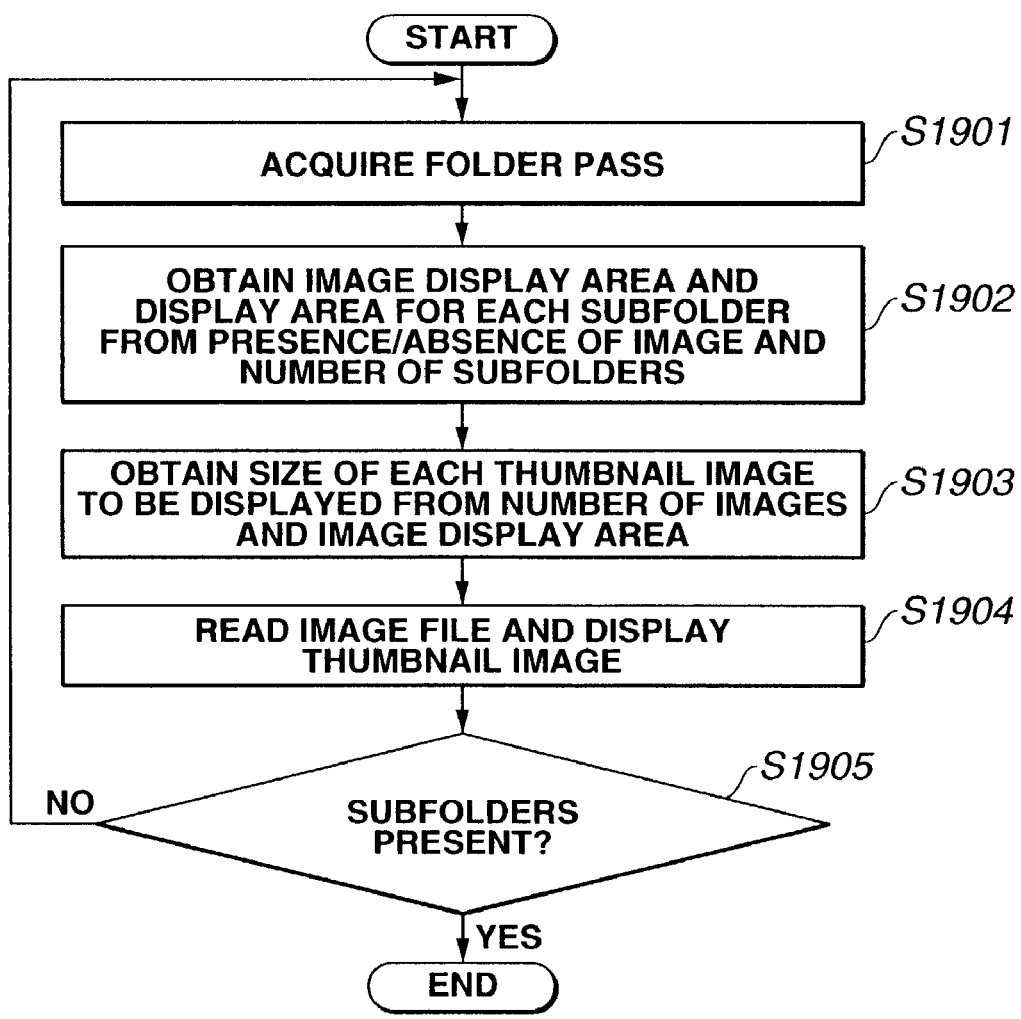
FIG. 19 is a flowchart illustrating an image display procedure in a zooming mode, according to the embodiment.

FIG. 19 illustrates a display procedure in the zooming mode. First, in step S1901, the folder pass 1802a for the point indicated by the pointer 1801 is acquired.

Then, in step S1902, it is determined whether or not an image is present within the concerned folder by seeing the pointer 1802b for the image-file-name structure, and whether or not a subfolder is present by seeing the pointer 1802c for subfolders, and if subfolders are present, the number of subfolders is acquired.

In step S1902, an area for displaying image files immediately below the concerned folder is also obtained, and an area for displaying each subfolder, on the window.

Then, in step S1903, the size of each thumbnail image is obtained from the number of image files and the size of an area for displaying images. Then, in step S1904, each image file is read and the corresponding thumbnail image is displayed. Then, in step S1905, it is determined whether or not remaining subfolders are present. If the result of the determination in step S1905 is negative, the process is terminated.

When double clicking a subfolder as that shown in FIG. 1, the pointer 1801 is moved to the structure of that subfolder. By displaying portions below the structure, enlarged display is performed.

When depressing the return button 51 for returning to an upper hierarchy shown in FIG. 5, by moving the pointer 1801 to the structure of the immediately preceding folder, all images below the upper hierarchy can be displayed.

Figure 20:
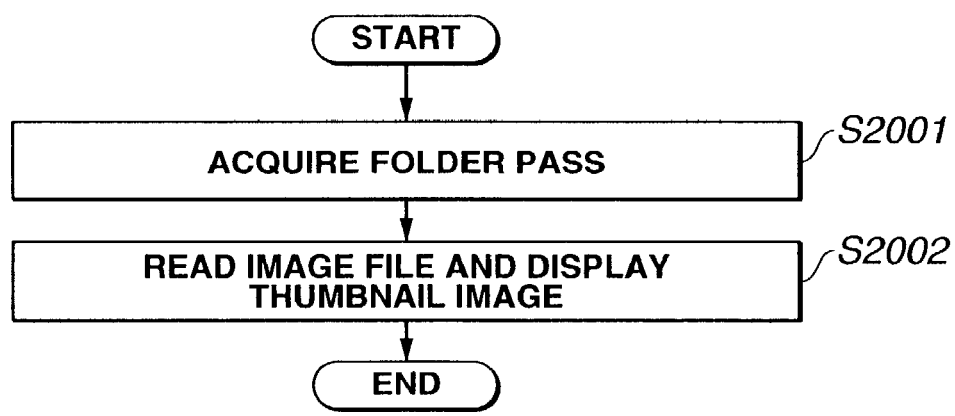
FIG. 20 is a flowchart illustrating an image display procedure in a scrolling mode, according to the embodiment.

FIG. 20 illustrates a display procedure in the scrolling mode. First, in step S2001, a folder pass is acquired from the structure indicated by the pointer 1801. Then, in step S2002, an image-file-name structure corresponding to the structure indicated by the pointer 1801 is acquired, and an image file is read.

Since the size of thumbnail images are fixed, a thumbnail image having that size is formed, and image display is performed. When the image exceeds the window area, a scrolling bar is displayed. As described above, by using the same data structure, it is possible to realize a display method in both of the zooming mode and the scrolling mode, and simply perform switching between these modes.

Accordingly, for example, when the user intends to quickly find an image managed by image management software, the zooming mode is suitably used. When the user intends to see images stored within a folder by being classified, the scrolling mode is suitably used. When it is intended to quickly find and see an image managed by the image management software, switching between these modes can be easily performed.

Accordingly, images received from the digital camera 310 can be displayed on the display 302 of the PC in accordance with the user's object.

OTHER EMBODIMENTS

The present invention may also be applied to a case in which, in order to operate various devices for realizing the functions of the above-described embodiment, program codes of software for realizing the functions of the above-described embodiment are supplied to a computer (a CPU or an MPU (microprocessor unit)) within an apparatus or a system connected to the various devices, and the devices are operated in accordance with a program stored in the computer of the system or the apparatus.

In such a case, the program codes, provided as software, realize the functions of the above-described embodiment, so that the program codes themselves, and means for supplying the computer with the program codes, such as a recording medium storing the program codes, constitute the present invention. For example, a flexible disk, a hard disk, an optical disk, a magnetooptical disk, a CD-ROM, a magnetic tape, a nonvolatile memory card, a ROM or the like may be used as the storage medium for storing the program codes.

Such program codes, of course, constitute the present invention not only in a case in which the functions of the above-described embodiment are realized by execution of the supplied program codes by a computer, but also in a case in which the functions of the above-described embodiment are realized by the program codes in cooperation with an OS, another application software or the like, operating in the computer.

The present invention may, of course, be applied to a case in which, after storing supplied program codes in a memory provided in a function expanding board of a computer or in a function expanding unit connected to the computer, a CPU or the like provided in the function expanding board or the function expanding unit performs a part or the entirety of actual processing based on instructions of the program codes, and the functions of the above-described embodiment are realized by the processing.

As described above, after connecting an image input apparatus, processing to be performed by the user is automatically selected. When reception of images is selected, options for a type of the images to be received are shown. Hence, an operation when receiving images can be easily performed.

Furthermore, since options for an operation for the received image are consecutively shown, an operation when receiving images can be more easily performed.

By showing the contents of an immediately preceding operation, and automatically performing the same operation if it is only necessary to perform the same operation, an operation when receiving images can be more easily performed.

When intending to execute an operation different from the immediately preceding operation, the contents of the operation are newly set. Hence, an improved operation for an image can be performed.

When displaying images received by the user, both of a mode of displaying all images including images within subfolders, and a mode of displaying images within a folder with a fixed size, are provided, and switching can be performed between the two modes. As a result, it is possible to provide a method of reviewing images adapted to the user's object.

The individual components shown in outline or designated by blocks in the drawings are all well known in the image management apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image management apparatus for managing images input from an image input device, comprising:

initial options showing means for showing options for prompting a user to select a respective one of a plurality of options for proceeding with image management upon initial connection of the image input device to the image management apparatus, the plurality of options including at least an option to display a summary of images within the image input device and an option to automatically receive images of a selected image type from the image input device;

selected option contents recognition means for recognizing contents of a selection by the user of an option for proceeding with image management from among the options shown by the initial options showing means;

image type options showing means for showing options for prompting the user to select a respective one of a multiplicity of image types for images to be automatically received from the image input device when the user has selected the option to automatically receive images of a selected image type from among the options shown by the initial options showing means; and selected image type recognition means for recognizing a selection by the user of an image type from among the options shown by the image type options showing means.

2. An image management apparatus according to claim 1, further comprising:

image receiving means for automatically receiving from the image input device images of an image type selected by the user and recognized by said selected image type recognition means, the automatically receiving of images of an image type selected by the user including automatically selecting images of the image type selected by the user and recognized by the selected image type recognition means from among images within the image input means, to be automatically received, using prespecified image type information associated with respective images within the image input device.

3. An image management apparatus according to claim 2, further comprising:

received-image operation options showing means for showing options for prompting the user to select a respective one of a plurality of operations to be performed on images of a respective image type selected by the user and recognized by the selected image type recognition means, received by said image receiving means;

selected received-image operation option contents recognition means for recognizing contents of a selection by the user of an operation from among the options shown by said received-image operation options showing means; and received-image operation execution means for executing on images of a respective image type selected by the user and recognized by the selected image type recognition means, received by the image receiving means, an operation selected by the user and recognized by said selected received-image operation option contents recognition means.

4. An image management apparatus according to claim 3, wherein selection by the user of an operation to be performed on images of a respective image type selected by the user and recognized by the selected image type recognition means, received by the image receiving means, is made before the images on which the operation selected by the user is to be performed are received by the image receiving means.

5. An image management apparatus according to claim 3, wherein the options shown by the received-image operation options showing means include at least an option to perform a slide show using at least one of the images received by the image receiving means of a respective image type selected by the user and recognized by the selected image type recognition means, an option to perform index printing of at least one of the images received by the image receiving means of a respective image type selected by the user and recognized by the selected image type recognition means, an option for sending by electronic mail at least one of the images received by the image receiving means of a respective image type selected by the user and recognized by the selected image type recognition means, and an option for uploading onto contents of a server on a communications network at least one of the images received by the image receiving means of a respective image type selected by the user and recognized by the selected image type recognition means.

6. An image management apparatus according to claim 2, further comprising:

folder forming means for forming at least one folder, each identified by a respective date on which at least one of the images received by the image receiving means was captured by the image input device, each one of the at least one folder for containing respective ones of the images received by the image receiving means, captured by the image input device on the date by which the folder is identified, the at least one folder being formed by the folder forming means when respective images are received by the image receiving means; and image storage means for storing each of the images received by the image receiving means within a respective ones of the at least one folder formed by said folder forming means, wherein each one of the at least one folder contains only one or more images captured by the image input device on the date by which the folder is identified.

7. An image management apparatus according to claim 6, further comprising:

image display means for displaying images stored in the image storage means in a selectable one of at least an all-images display mode for displaying on a display screen images stored in the image storage means within a respective one of the at least one folder formed by the folder forming means and selected by the user, the images being displayed in the all images display mode in an image size automatically adjusted so that all images within the respective one of the at least one folder selected by the user may be concurrently displayed on the display screen, and a fixed-size-image display mode for displaying on the display screen, in a predefined fixed image size, as many of the images stored in the image storage means within a respective one of the at least one folder formed by the folder forming means and selected by the user, as may be concurrently displayed on the display screen in the predefined fixed image size; and image display mode selection means for selection by the user of a respective one of the all-images display mode and the size-image display mode to be used by the image display means within the respective one of the folders formed by the folder forming means and selected by the user for displaying images stored in the image storage means.

8. An image management apparatus according to claim 2, further comprising:

folder forming means for forming at least one folder, each identified by a respective date on which one or more images of an image type, selected by the user and recognized by the selected type recognition means, were received by the image receiving means, each one of the at least one folder for containing images received by the image receiving means on the date by which the folder is identified, the at least one folder being formed by the folder forming means when images are received by the image receiving means, and image storage means for storing each one of the images received by the image receiving means within a respective one of the at least one folder formed by said folder forming means, wherein each one of the at least one folder contains only one or more images received by the image receiving means on the date by which the folder is identified.

9. An image management apparatus according to claim 2, further comprising:

currently-selected option contents storage means for storing contents of a selection by the user of a respective one of the plurality of options for proceeding with image management from among the options shown by the initial options showing means upon the initial connection of the image input device to the image management apparatus, or for storing contents resulting from a subsequent change made by the user to the initial selection prior to a disconnection of the image input device from the image management apparatus;

currently-selected option contents showing means for showing the contents stored in currently-selected-option contents storage means for prompting the user to make any change to the contents being shown and to actuate means for providing an instruction to continue image management upon subsequent reconnection of the image input device to the image management apparatus; and continuation of image management control means responsive to the absence of any change to the contents shown by the currently-selected option contents showing means, upon the subsequent reconnection of the image input device, and to an actuation by the user of the means for providing an instruction to continue image management, for controlling continuation of image management in accordance with the contents stored in the currently-selected option contents storage means resulting from the absence of any change by the user to the contents shown by the currently-selected-option contents means showing.

10. An image management apparatus according to claim 9, wherein the continuation of image management control means is responsive to a change by the user to the contents shown by the currently-selected option contents showing means, upon the subsequent reconnection of the image input device, and to an actuation by the user of the means for providing the instruction to continue image management, for controlling continuation of image management in accordance with changed contents stored in the currently-selected option contents storage means resulting from the change by the user to the contents shown by the currently-selected option contents showing means.

11. An image management apparatus according to claim 3, wherein selection by the user of an operation to be performed on images of a respective image type selected by the user and recognized by the selected image recognition means, received by the image receiving means, is made after the images on which the operation selected by the user is to be performed are received by the image receiving means.

12. An image management apparatus according to claim 1, wherein the options shown by the image type options showing means include at least an option to automatically receive all images of an image type defined by being stored within the image input device, an option to automatically receive all images within the image input device of an image type defined by not having been previously received by the image management apparatus, an option to automatically receive all images within the image input device of an image type defined by being assigned for printing, an option to automatically receive all images within the image input device of an image type defined by being assigned for sending by electronic mail, and an option to automatically receive all images within the image input device of an image type defined by being assigned for uploading onto contents of a server on a communications network.

13. An image management method performed by a programmed computing apparatus for managing images input from an image input device, the method comprising:

an initial options showing step of showing options for prompting a user to select a respective one of a plurality of options for proceeding with image management upon initial connection of the image input device to the computing apparatus, the plurality of options including at least an option to display a summary of images within the image input device and an option to automatically receive images of a selected image type from the image input device;

a selected option contents recognition step of recognizing contents a selection by the user of an option from among the options shown in said initial options showing step;

an image type options showing step of showing options for prompting a user to select a respective one of a multiplicity of image types for images to be automatically received from the image input device when the user has selected the option to automatically receive from the image input device images of a selected image type from among the options shown in the initial options showing step; and a selected image type recognition step of recognizing an image type selected by the user from among the image type options shown in said image type options showing step.

14. An image management method according to claim 13, further comprising:

an image receiving step of automatically receiving from the image input device images of an image type selected by the user and recognized in said selected image type recognition step, the image receiving step including a step of automatically selecting images of the image type selected by the user and recognized in the selected image type recognition step from among images within the image input device, to be automatically received, by using prespecified image type information associated with respective images stored in the image input device.

15. An image management method according to claim 14, further comprising:
  a received-image operation options showing step of showing options for prompting the user to select a respective one of a plurality of operations to be performed on images of a respective image type selected by the user and recognized in the selected image type recognition step, received in said image receiving step;
  a selected received-image operation option contents recognition step of recognizing contents of a selection by the user of an operation from among the options shown in said received-image operation options showing step; and
  a received-image operation execution step of executing on images, of a respective image type selected image and recognized in the selected image type recognition step, received in the image receiving step, an operation selected by the user from among the options shown in the received-image operation options showing step.

16. An image management method according to claim 15, wherein selection by the user of an operation to be performed on images received in the image receiving step from among the options shown in the received-image operation options showing step is made before the images, on which the operation selected by the user is to be performed, are received in the image receiving step.

17. An image management method according to claim 15, wherein the options shown in the received-image operation options showing step include at least an option for performing a slide show using at least one of the images of a respective image type selected by the user and recognized in the selected image type recognition step, received in the image receiving step, an option for performing index printing of at least one of the images of a respective image type selected by the user and recognized in the selected image type recognition step, received in the image receiving step, an option for sending by electronic mail at least one of the of a respective image type selected by the user and recognized in the selected image type recognition step, received in the image receiving step, and an option for uploading onto contents of a server on a communication network at least one of the images of a respective image type selected by the user and recognized in the selected image type recognition step, received in the image receiving step.

18. An image management method according to claim 15, wherein selection by the user of an operation to be performed on images of a respective image type selected by the user and recognized in the selected image type recognition step, received in the image receiving step, from among the options shown in the receive-image operation options showing step, is made after images on which the operation selected by the user is to be performed are received in the image receiving step.

19. An image management method according to claim 14, wherein the options shown in the image type options showing step include at least an option for automatically receiving all images of an image type defined by being stored within the image input device, an option for automatically receiving all images within the image input device of an image type defined by not having been previously received by the computing apparatus, an option for automatically receiving all images within the image input device of an image type defined by being assigned to be printed, an option for automatically receiving all images within the image input device of an image type defined by being assigned for sending by electronic mail, and an option for automatically receiving all images within the image input device of an image type defined by being assigned for uploading onto contents of a server on a communications network.

20. An image management method according to claim 14, further comprising:
  a folder forming step of forming at least one folder, each identified by a respective date on which at least one of the images received in the image receiving step was captured by the image input device, each one of the at least one folder for containing respective ones of the images received in the image receiving step and captured by the image input device on the date by which the folder is identified, the folder forming step being carried out when images of an image type selected by the user and recognized in the selected image type recognition step are being received in the image receiving step; and
  an image storage step of storing in a preselected storage medium images received in the images receiving step within respective ones of the at least one folder formed in said folder forming step, wherein each one of the at least one folder contains only one or more images captured by the image input device on the date by which the folder is identified.

21. An image management method according to claim 20, further comprising:
  an image display step of displaying images stored in the preselected storage medium in a selectable one of at least an all-images display mode for displaying on a display screen all images stored in the preselected storage medium within a respective one of the at least one folder formed in the folder forming step and selected by the user, the images being displayed in the all-images display mode in an image size automatically adjusted so that all images within the respective one of the at least one folder selected by the user may be concurrently displayed on the display screen, and a fixed-size-image display mode for displaying on the display screen, in a predefined fixed image size, as many of the images within the respective one of the at least one folder selected by the user, as may be concurrently displayed on the display screen in the predefined fixed image size; and
  a display mode selecting step of selecting by the user one of the all-images display mode and the fixed-size-image display mode to be used in the image display step for displaying images stored in the preselected storage medium within the respective one of the at least one folder selected by the user.

22. An image management method according to claim 14, further comprising:
  a folder forming step of forming at least one folder, each identified by a respective date, on which one or more images of an image type selected by the user and recognized in the selected image type recognition step were received in the image receiving step, each one of the at least one folder for containing images received in the image receiving step on the date by which the folder is identified, the folder forming step being carried out when respective images are received in the image receiving step; and
  an image storage step of storing in a preselected storage medium images received in the image receiving step within respective ones of the at least one folder formed in said folder forming step, wherein each of the at least one folder contains only one or more images received in the image receiving step on the date by which the folder is identified.

23. An image management method according to claim 14, further comprising:
a currently-selected-option contents storage step of storing in a predetermined storage medium contents of an initial selection by the user of a respective one of the plurality of options for proceeding with image management from among the options shown in the initial options showing step upon the initial connection of the image input device to the computing apparatus, or of storing contents resulting from a subsequent change mode by the user to the initial selection prior to a disconnection of the image input device from the computing apparatus;
a currently-selected option contents showing step of showing the contents stored in the predetermined storage medium in the currently-selected option contents storage step, upon subsequent reconnection of the image input device to the computing apparatus, for prompting the user to make any chance to the contents being shown and to cause an instruction to continue image management to be provided; and
a continuation of image management control step of controlling continuation of image management in accordance with the contents stored in the predetermined storage medium in the currently-selected option contents storage step resulting from an absence of any change by the user to the contents shown in the currently-selected option contents showing step, when the user has not made any change to the contents shown in the currently-selected option contents showing step and has caused the instruction to continue image management to be provided.

24. An image management method according to claim 23, wherein the continuation of image management control step controls continuation of image management in accordance with changed contents stored in the predetermined storage medium resulting from a change by the user to the contents shown in the currently-selected-option contents showing step, when the user has made a change to the contents shown in the currently-selected option showing step and has caused the instruction to continue image management to be provided.

25. A storage medium storing a computer program capable of being read and executed by a computer system, said computer program comprising:
instructions for operatively providing an initial options showing unit for showing options for prompting a user to select a respective one of a plurality of options for proceeding with image management upon initial connection of an image input device to the computer system, the initial options including at least an option to display a summary of images within the image input device and an option to automatically receive images of a selected image type from the image input device;
instructions for operatively providing a selected option contents recognition unit for recognizing contents of a selection by the user of an option for proceeding with image management from among the options shown by the initial options showing unit;
instructions for operatively providing an image type options showing unit for showing option for prompting the user to select a respective one of a multiplicity of image types for images to be automatically received from the image input device, when the user has selected the option to automatically receive images of a selected image type from among the options shown by the initial options showing unit;
instructions for operatively providing a selected image type recognition unit for recognizing a selection by the user of an image type from among the options shown by the image type options showing unit; and
instructions for operatively providing an image receiving unit for automatically receiving from the image input device images of an image type selected by the user and recognized by the image type recognition unit, the automatically receiving of images by the image receiving unit including automatically selecting images of the image type selected by the user and recognized by the selected image type recognition unit from among images within the image input device, to be automatically received, using the prespecified image type information associated with respective images within in the image input device.

26. A computer program capable of being read and executed by a computer system, said computer program comprising:
instructions for operatively providing an initial options showing unit for showing options for prompting a user to select a respective one of a plurality of options for proceeding with image management upon initial connection of an image input device to the computer system, the plurality of options including at least an option to display a summary of images within the image input device and an option to automatically receive images of a selected image type from the image input device;
instructions for operatively providing a selected option contents recognition unit for recognizing contents of a selection by the user of an option for proceeding with image management from among the options shown by the initial options showing unit;
instructions for operatively providing an image type options showing unit for showing options for prompting the user to select a respective one of a multiplicity of image types for images to be automatically received from the image input device, when the user has selected the option to automatically receive images of a selected image type from among the options shown by the initial options showing unit;
instructions for operatively providing a selected image type recognition unit for recognizing a selection by the user of an image type from among the options shown by the image type options showing unit; and
instructions for operatively providing an image receiving unit for automatically receiving from the image input device images of an image type selected by the user and recognized by said image type recognition unit, the automatically receiving of images by the image receiving unit including automatically selecting images of the image type selected by the user and recognized by the selected image type recognition unit from among images within the image input device, to be automatically received, using the preselected image type information associated with respective images within the image input device.

27. An image management apparatus for managing images input from an image input device, comprising:
initial options showing means for showing options for prompting a user to select a respective one of a plurality of options for proceeding with image management upon initial connection of the image input device to the image management apparatus, the plurality of options including at least an option to display a summary of images within the image input device and an option to automatically receive images of a selected image type from the image input device;

currently-selected option contents storage means for storing contents of an initial selection by the user of an option for proceeding with image management from among the options shown by the initial options showing means upon the initial connection of the image input device to the image management apparatus, or for storing contents resulting from a subsequent change by the user to the initial selection made prior to a disconnection of the image input device from the image management apparatus;

currently-selected option contents showing means for showing the contents stored in the currently-selected option contents storage means upon subsequent reconnection of the image input device to the image management apparatus, for prompting the user to make any change to the contents being shown and to actuate means for providing an instruction to continue image management; and means for controlling continuation of image management responsive to an absence of any change by the user to the contents shown by the currently-selected option contents showing means and to an actuation by the user of the means for providing the instruction to continue image management, for controlling continuation of image management in accordance with the contents stored in the currently-selected option contents storage means resulting from the absence of any chance by the user to the contents shown by the currently-selected option contents showing means.

28. An image management apparatus according to claim 27, wherein the continuation of image management control means for controlling continuation of image management is responsive to a change made by the user to the contents shown by the currently-selected option contents showing means and to an actuation by the user of the means for providing the instruction to continue image management, for controlling continuation of image management in accordance with changed contents stored in the currently-selected option contents storage means resulting from the change made by the user to the contents shown by the currently-selected option contents showing means.

29. An image management method performed by a programmed computing apparatus for managing images input from an image input device, said method comprising:

an initial options showing step of showing options for prompting a user to select a respective one of a plurality of options for proceeding with image management upon initial connection of the image input device to the computing apparatus, the plurality of options including at least an option to display a summary of images within the image input device and a option to automatically receive images of a selected image type from the image input device;

a currently-selected option contents storing step of storing in a predetermined storage medium contents of an initial selection by the user of an option for proceeding with image management from among the options shown in the initial options showing step upon the initial connection of the image input device to the computing apparatus, or of storing contents resulting from a subsequent change made by the user to the initial selection prior to a disconnection of the image input device from the computing apparatus;

a currently-selected option contents showing step of showing the contents stored in the predetermined storage medium in the currently-selected option contents storage step upon subsequent reconnection of the image input device to the computing apparatus, for prompting the user to make any change to the contents being shown and to cause an instruction to continue image management to be provided; and a continuation of image management control step of controlling continuation of image management in accordance with the contents stored in the predetermined storage medium in the currently-selected option contents storage step resulting from an absence of any change by the user to the contents shown in the currently-selected option contents showing step, when the user has not made any change to the contents shown in the currently-selected option contents showing step and has caused the instruction to continue image management to be provided.

30. An image management method according to claim 29, wherein the continuation of image management control step controls continuation of image management in accordance with changed contents in the predetermined storage medium resulting from a change by the user to the contents shown in the currently-selected option contents showing step, when the user has made the change to the contents shown in the currently-selected option showing step and has caused the instruction to continue image management to be provided.

31. A storage medium storing a computer program capable of being read and executed by a computer system, said computer program comprising:

instructions for operatively providing an initial options showing unit for showing options for prompting a user to select a respective one of a plurality of options for proceeding with image management upon initial connection of an image input device to the computer system, the plurality of options including at least an option to display a summary of images within the image input device and an option to automatically receive images of a selected image type from the image input device;

instructions for operatively providing a currently-selected option contents storage unit for storing contents of an initial selection by the user of an option for proceeding with image management from among the options shown by the initial options showing unit upon the initial connection of the image input device to the computer system, or for storing contents resulting from a subsequent change by the user to the initial selection prior to a disconnection of the image input device from the computer system;

instructions for operatively providing a currently-selected option contents showing unit for showing the contents stored in the currently-selected option contents storage unit upon subsequent reconnection of the image input device to the computer system, for prompting the user to make any change to the contents being shown and to actuate means for providing the instruction to continue image management; and instructions for operatively providing a continuation of image management control unit responsive to an absence of any change by the user to the contents shown by the currently-selected option contents showing unit and to an actuation by the user of the means for providing the instruction to continue image management, for controlling continuation of image management in accordance with the contents stored in the currently-selected option contents storage unit resulting from the absence of any change by the user to the contents shown by the currently-selected option contents showing means.

32. A storage medium storing a computer program according to claim 31, wherein the instructions for operatively providing a continuation of image management control unit operatively provides a continuation of image management control unit which is also responsive to a change by the user to the contents shown by the currently-selected option contents showing unit and to an actuation by the user of the means for providing the instruction to continue image management, for controlling continuation of image management in accordance with changed contents stored in the currently-selected option contents storage unit resulting from the change by the user to the contents shown by the currently-selected option contents showing unit.

33. A computer program capable of being read and executed by a computer system, the computer program comprising:

instructions for operatively providing an initial options showing unit for showing options for prompting a user to select a respective one of a plurality of options for proceeding with image management, upon initial connection of an image input device to the computer system, the plurality of options including at least an option to display a summary of images within the image input device and an option to automatically receive images of a selected image type from the image input device;

instructions for operatively providing a currently-selected option contents storage unit for storing an initial selection by the user of an option for proceeding with image management from among the options shown by the initial options showing unit upon the initial connection of the image input device to the computer system, or for storing contents resulting from a subsequent change by the user to the initial selection made prior to a disconnection of the image input device from the computer system;

instructions for operatively providing a currently-selected option contents showing unit for showing the contents stored in the currently-selected option contents storage unit, upon subsequent reconnection of the image input device in the computer system, for prompting the user to make any change to the contents being shown and to actuate means for providing an instruction to continue image management; and instructions for operatively providing a continuation of image management control unit responsive to the absence of any change by the user to the contents shown by the currently-selected option contents showing unit and to actuation by the user for providing the instruction to continue image management, for controlling continuation of image management in accordance with the contents stored in the currently-selected option contents storage unit resulting from the absence of any change by the user to the contents shown by the currently-selected option contents showing means.

34. A computer program according to claim 33, wherein the instructions for operatively providing a continuation of image management control unit operatively provides a continuation of image management unit which is also responsive to a change by the user to the contents shown by the currently-selected option contents showing unit and to an actuation by the user of the means for providing the instruction to continue image management, for controlling continuation of image management in accordance with changed contents stored in the predetermined storage medium by currently-selected option contents storage unit resulting from a change by the user to the contents shown by the currently-selected option contents showing unit, when the user has changed the contents shown by the currently-selected option showing unit and has actuated the means for providing the instruction to continue image manage management.

* * * * *

UNITED STATES PATENT AND TRADEMARK OFFICE
CERTIFICATE OF CORRECTION

PATENT NO. : 7,119,818 B2
APPLICATION NO. : 10/241577
DATED : October 10, 2006
INVENTOR(S) : Hideo Takiguchi It is certified that error appears in the above-identified patent and that said Letters Patent is hereby corrected as shown below:

COLUMN 10:

Line 28, "are" should read --is--; and
    Line 52, "indenting" should read --intending--.

COLUMN 12:

Line 13, "magnetooptical" should read --magneto-optical--.

COLUMN 15:

Line 21, "means," should read --means;--; and
    Line 60, "means showing." should read --showing means.--.

COLUMN 16:

Line 42, "contents" should read --contents of--.

COLUMN 17:

Line 40, "the" should read --the images--; and
    Line 53, "receive-image" should read --received-image--.

COLUMN 19:

Line 23, "chance" should read --change--; and
    Line 65, "option" should read --options--.

UNITED STATES PATENT AND TRADEMARK OFFICE
CERTIFICATE OF CORRECTION

PATENT NO. : 7,119,818 B2
APPLICATION NO. : 10/241577
DATED : October 10, 2006
INVENTOR(S) : Hideo Takiguchi It is certified that error appears in the above-identified patent and that said Letters Patent is hereby corrected as shown below:

<u>COLUMN 21</u>:

Line 33, "chance" should read --change--.

Signed and Sealed this

Third Day of July, 2007

JON W. DUDAS
*Director of the United States Patent and Trademark Office*